(12) United States Patent
Ferryman et al.

(10) Patent No.: US 8,505,923 B2
(45) Date of Patent: Aug. 13, 2013

(54) BRUSH SEAL WITH STRESS AND DEFLECTION ACCOMMODATING MEMBRANE

(75) Inventors: Roger Ferryman, Moseley, VA (US); Patrick Fitzgerald, Richmond, VA (US)

(73) Assignee: Sealeze, A Unit Of Jason, Inc., Richmond, VA (US)

( * ) Notice: Subject to any disclaimer, the term of this patent is extended or adjusted under 35 U.S.C. 154(b) by 650 days.

(21) Appl. No.: 12/731,421

(22) Filed: Mar. 25, 2010

(65) Prior Publication Data

US 2011/0049810 A1 Mar. 3, 2011

Related U.S. Application Data

(60) Provisional application No. 61/238,666, filed on Aug. 31, 2009.

(51) Int. Cl.
*F01D 11/02* (2006.01)
(52) U.S. Cl.
USPC .......................................... 277/355
(58) Field of Classification Search
USPC .......................................... 277/355
See application file for complete search history.

(56) References Cited

U.S. PATENT DOCUMENTS

| | | | |
|---|---|---|---|
| 2,549,656 A | 4/1951 | Yerrick et al. | |
| 3,124,502 A * | 3/1964 | Radke | 428/66.4 |
| 4,073,337 A | 2/1978 | Stockman | |
| 4,124,063 A | 11/1978 | Stockman | |
| 4,358,120 A | 11/1982 | Moore | |
| 4,651,809 A | 3/1987 | Gollnick et al. | |
| 4,673,026 A | 6/1987 | Hagar et al. | |
| 4,791,980 A | 12/1988 | Hagar et al. | |
| 4,825,936 A | 5/1989 | Hoagland et al. | |
| 4,940,080 A | 7/1990 | Reeves et al. | |
| 5,002,116 A | 3/1991 | Hoagland et al. | |
| 5,074,531 A | 12/1991 | Tanaka et al. | |
| 5,076,590 A | 12/1991 | Steinetz et al. | |
| 5,090,710 A | 2/1992 | Flower | |

(Continued)

FOREIGN PATENT DOCUMENTS

| | | |
|---|---|---|
| CN | 200610078873 | 11/2007 |
| DE | 1921923 | 11/1969 |

(Continued)

OTHER PUBLICATIONS

"Service and Ersatzteile fur regenerative Warmetauscher", Alstom Power Air Preheater GmbH, Druckschrift Nr. D AGT 1002 01 D, undated, 8 pages.

(Continued)

*Primary Examiner* — Vishal Patel
*Assistant Examiner* — L. Susmitha Koneru
(74) *Attorney, Agent, or Firm* — Boyle Fredrickson, S.C.

(57) ABSTRACT

A brush seal usable in high temperature sealing applications having brush bristles and a sealing membrane of stress and deflection accommodating construction capable of longitudinal extensibility. Sealing membrane has one portion slidably overlapped with another portion. In one embodiment, membrane is folded over itself providing slidable overlapping in one direction and is formed of overlapping membrane sheets providing slidable overlapping in another direction. In another embodiment, membrane has spaced apart deformation regions providing longitudinal extensibility in accommodating stress and/or deflection. Membrane can be made of metallic foil having a thickness no greater than brush bristle width or diameter and is embeddable in bristles of the brush seal.

28 Claims, 14 Drawing Sheets

(56) References Cited

U.S. PATENT DOCUMENTS

| | | | |
|---|---|---|---|
| 5,137,078 A | 8/1992 | Borowy | |
| 5,316,318 A | 5/1994 | Veau | |
| 5,362,449 A | 11/1994 | Hedenhag | |
| 5,363,906 A | 11/1994 | Borowy | |
| 5,400,586 A * | 3/1995 | Bagepalli et al. | 60/800 |
| 5,474,305 A | 12/1995 | Flower | |
| 5,498,139 A | 3/1996 | Williams | |
| 5,529,113 A | 6/1996 | Borowy | |
| 5,749,584 A | 5/1998 | Skinner et al. | |
| 5,881,799 A | 3/1999 | Kozacka et al. | |
| 5,915,339 A | 6/1999 | Cox et al. | |
| 5,944,320 A | 8/1999 | Werner et al. | |
| 5,950,707 A | 9/1999 | Kozacka et al. | |
| 5,975,535 A * | 11/1999 | Gail et al. | 277/355 |
| 6,030,175 A | 2/2000 | Bagepalli et al. | |
| 6,079,714 A * | 6/2000 | Kemsley | 277/303 |
| 6,109,616 A | 8/2000 | Mayr | |
| 6,139,018 A | 10/2000 | Cromer et al. | |
| 6,231,047 B1 | 5/2001 | Cunningham et al. | |
| 6,308,957 B1 | 10/2001 | Wright | |
| 6,425,472 B1 | 7/2002 | Davis et al. | |
| 6,471,212 B1 | 10/2002 | Dierker et al. | |
| 6,505,835 B2 * | 1/2003 | Tong et al. | 277/355 |
| 6,581,676 B2 | 6/2003 | Fierle et al. | |
| 6,598,664 B2 | 7/2003 | Fierle et al. | |
| 6,679,500 B1 | 1/2004 | Maurer et al. | |
| 6,739,592 B2 | 5/2004 | Kono | |
| 6,772,482 B2 | 8/2004 | Crudgington | |
| 6,789,605 B1 | 9/2004 | Kaser | |
| 6,808,179 B1 | 10/2004 | Bhattacharyya et al. | |
| 6,840,518 B2 | 1/2005 | Boston | |
| 6,854,735 B2 | 2/2005 | Sarshar et al. | |
| 6,910,858 B2 | 6/2005 | Addis | |
| 7,000,923 B2 | 2/2006 | Addis | |
| 7,059,386 B1 | 6/2006 | Kaser | |
| 7,168,708 B2 | 1/2007 | Dalton et al. | |
| 7,231,958 B1 | 6/2007 | Kaser et al. | |
| 7,278,378 B2 | 10/2007 | Counterman | |
| 7,410,173 B2 | 8/2008 | Justak | |
| 7,416,016 B1 | 8/2008 | Kaser | |
| 7,475,544 B2 | 1/2009 | Counterman | |
| 2002/0050684 A1 * | 5/2002 | Kono | 277/355 |
| 2002/0140175 A1 * | 10/2002 | Kono | 277/355 |
| 2003/0178778 A1 * | 9/2003 | Szymbor et al. | 277/355 |
| 2003/0197333 A1 | 10/2003 | Zakel et al. | |
| 2003/0201608 A1 | 10/2003 | Addis | |
| 2005/0139272 A1 | 6/2005 | Thornton | |
| 2008/0224415 A1 * | 9/2008 | Flaherty et al. | 277/355 |
| 2008/0296846 A1 * | 12/2008 | Daggett et al. | 277/355 |
| 2008/0309017 A1 | 12/2008 | Mattice | |
| 2009/0033037 A1 * | 2/2009 | Varanasi et al. | 277/355 |
| 2009/0056908 A1 | 3/2009 | Halbe et al. | |
| 2009/0145574 A1 | 6/2009 | Kilsura | |
| 2009/0315272 A1 * | 12/2009 | Kasahara et al. | 277/355 |
| 2010/0001473 A1 * | 1/2010 | Crudgington et al. | 277/355 |
| 2010/0068042 A1 * | 3/2010 | Bruck et al. | 415/174.2 |
| 2010/0181043 A1 | 7/2010 | Mueller et al. | |
| 2010/0201073 A1 * | 8/2010 | Adis et al. | 277/355 |
| 2010/0327536 A1 * | 12/2010 | Beichl | 277/355 |
| 2011/0018204 A1 * | 1/2011 | Beichl | 277/300 |
| 2011/0121517 A1 * | 5/2011 | Crudgington | 277/355 |
| 2011/0200432 A1 * | 8/2011 | Alamsetty et al. | 415/230 |
| 2011/0227289 A1 * | 9/2011 | Stefan | 277/355 |
| 2011/0272891 A1 * | 11/2011 | Adis et al. | 277/355 |
| 2012/0086172 A1 * | 4/2012 | Zheng et al. | 277/355 |
| 2012/0104700 A1 * | 5/2012 | Peer et al. | 277/355 |
| 2012/0187635 A1 * | 7/2012 | Crudgington | 277/355 |

FOREIGN PATENT DOCUMENTS

| | | |
|---|---|---|
| DE | 8211583.4 | 8/1982 |
| DE | 8801155.0 | 7/1989 |
| EP | 0167757 | 9/1987 |
| EP | 0429648 | 8/1993 |
| EP | 0893632 | 1/1999 |
| EP | 1584869 | 10/2005 |
| EP | 1777478 | 8/2007 |
| EP | 1892442 | 2/2008 |
| GB | 683282 | 11/1952 |
| GB | 1133191 | 11/1968 |
| GB | 1479587 | 7/1977 |
| GB | 2021210 | 11/1979 |
| GB | 2119037 | 11/1983 |
| GB | 2393223 | 3/2004 |
| JP | 61-195291 | 8/1986 |
| WO | 2007019256 | 2/2007 |
| WO | 2008009431 | 1/2008 |

OTHER PUBLICATIONS

"Modifications to the Air Preheaters at Matra Power Station in Hungary Increase the Boiler Efficiency by Over 1.9%", Howden, HSL C005a, Oct. 2005, 2 pages.

"Closing the Gap for American Industry" Sealeze Corporation, 1985, 8 pages.

* cited by examiner

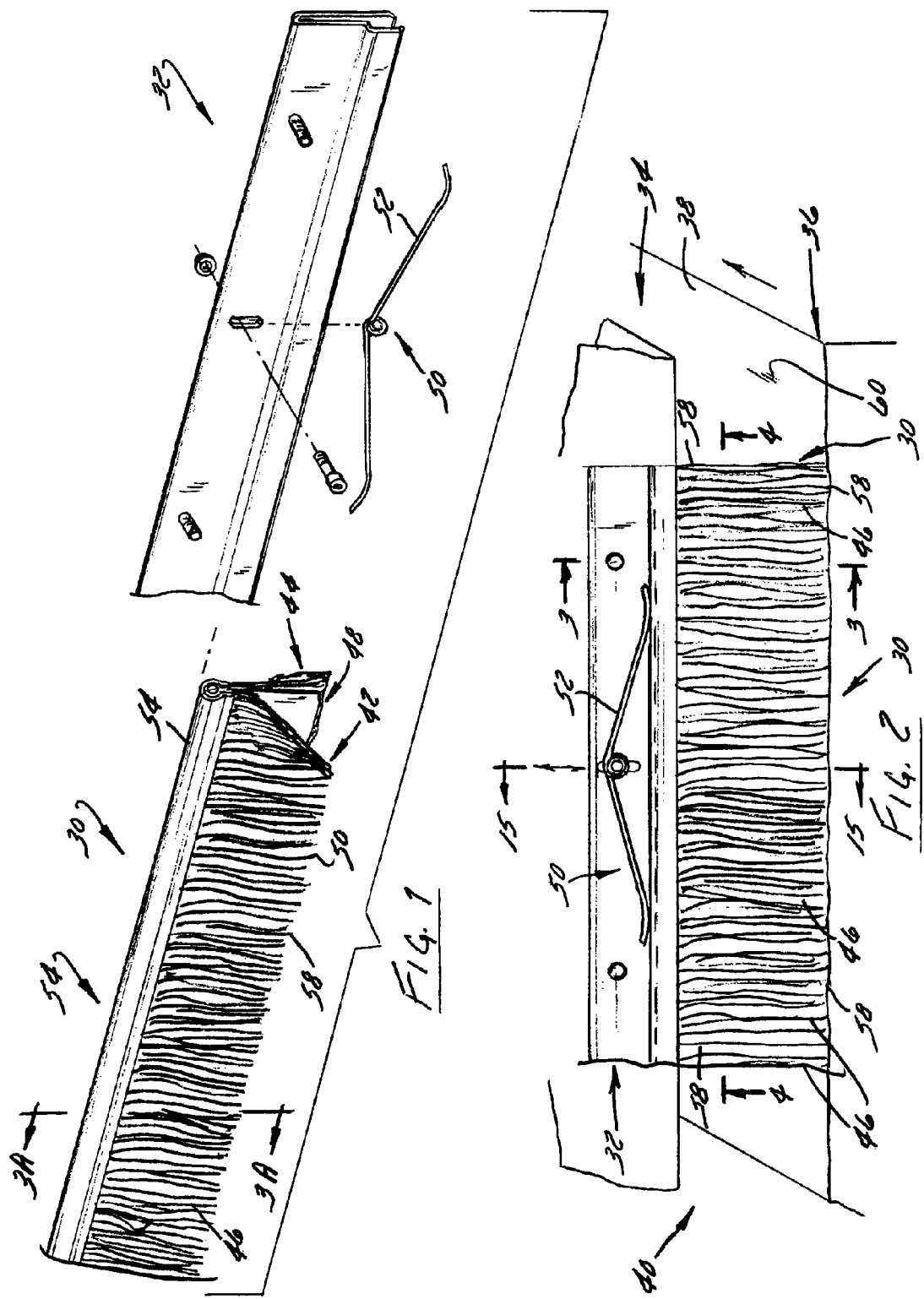

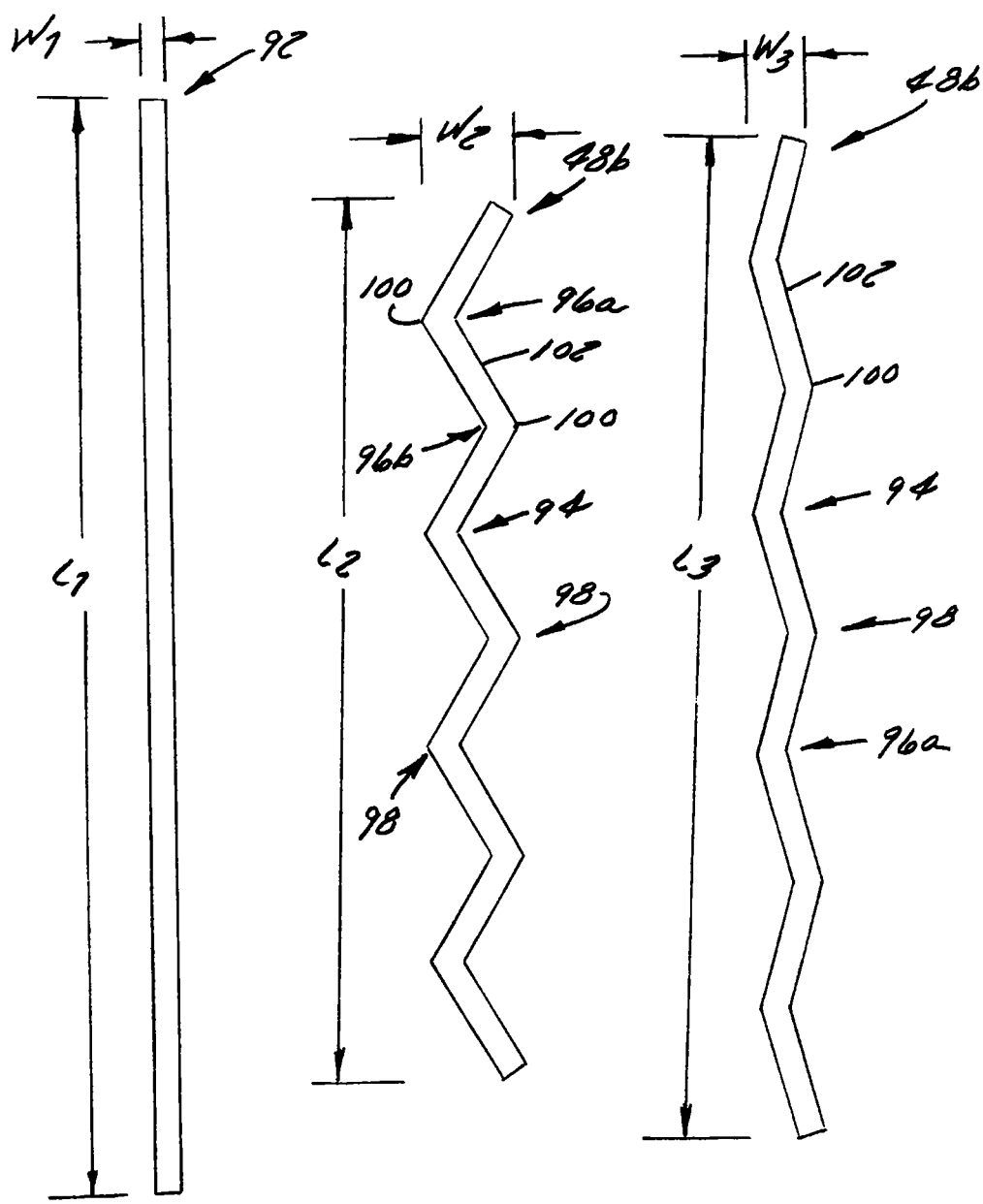

BRUSH SEAL WITH STRESS AND DEFLECTION ACCOMMODATING MEMBRANE

CROSS-REFERENCE

This application claims the benefit under 35 U.S.C. §119 (e) of U.S. Provisional Application Ser. No. 61/238,666, filed Aug. 31, 2009, the entirety of which is expressly incorporated by reference herein.

FIELD

The present invention relates to brush-type seals and more particularly to a brush seal with an embedded stress and deflection accommodating membrane nestled in the bristles of the brush that is suitable for high temperature use.

BACKGROUND

In the past, many types and arrangements of seals have been used in many different environments and equipment to provide a thermal barrier between different temperature fluids in adjacent regions. Examples of such seals include plate seals, membrane seals, metal strip seals, labyrinth seals, and leaf seals.

One type of equipment where seals are used to provide a thermal barrier is an air preheater used to recover heat from hot exhaust gas to increase thermal efficiency. One type of air preheater commonly used with industrial boilers is a regenerative air heater to preheat air entering a boiler with heat recovered flue gases exiting the boiler increasing efficiency and reducing $CO_2$ emissions. Regenerative air heaters are commonly used in boilers in coal fired power plants throughout the world. (as well as fluidized bed boilers, waste-to-energy incinerators, and in hydrocarbon processing, steel mills, pulp & paper plants, chemical plants and other heavy industries.)

A regenerative air heater, also known as a preheater, has a circular rotor that rotates relatively slowly (about 3-5 rpm) within a heater casing during operation. The most common type is of the Ljungström design where the rotor is divided into a number of sectors each containing a heat absorbing medium. As the rotor rotates, the heat absorbing medium in each sector alternately recovers heat from hot flue gases exiting the boiler and transfers the recovered heat to cooler intake air entering the boiler preheating the air.

In the past, removable metal strip seals have been used between each sector and the preheater casing to prevent flue gas leakage. As the rotor rotates, the metal strip seals wear as a result of frictional contact between their outer edge and the surface against which they are intended to seal. Due to temperature changes in the preheater, thermal expansion causes the size of the gaps to fluctuate. The seal wears to the smallest gap size, leaving the larger gaps sizes unsealed. These metal strip seals are also subject to degradation from corrosion as well as erosion due to the relatively corrosive high temperature, high air flow atmosphere in which they operate. Additionally, if the metal strip seals are installed improperly, of there is an unusually large deviation in the predicted gap, the seals can completely break-off or they can cause the rotor to stop, forcing an unscheduled outage. Because the seals can only be replaced when the preheater is offline, replacement is infrequent as it can only be done during regularly scheduled downtime for boiler servicing.

Since boiler downtime is extremely costly, scheduled downtime is limited to only once or twice per year, and in some cases once every three years. The metal strip seals often degrade substantially during the normal operating cycle, resulting in seal leakage increasing to an unacceptable level well before scheduled downtime occurs. Flue gas leakage reduces heat transfer to air entering the boiler, which reduces boiler efficiency. Leakage of flue gas into the air entering the boiler not only further reduces boiler efficiency but it also undesirably increases boiler $CO_2$ emissions due to increased fuel consumption. Air leakage causes the induced-draft and forced draft fans to work harder consuming more energy. Air heater leakage also affects the performance of air pollution control equipment due to impact of inconsistent temperatures on airflow, densities, catalytic reactions and corrosion downstream.

Brush seals have also been used in the past that employ metal brush bristles. While brush seals have proven superior to metal strip seals in reliability due to their flexibility and wear resilience, their permeable nature still allows undesirable leakage such that this type of seal has not been believed to heretofore been adopted in regenerative air preheaters.

One type of brush seal often used in turbine and turbo-equipped machinery applications includes a plate-type membrane that can be positioned within the bristles transversely or longitudinally relative to the brush seal. Even though such membranes have been disclosed to be flexible, they are considerably thicker than brush bristle diameter in order to support the bristles during brush seal operation. Unless seals of this type are in an annular or inverted ring configuration, where they are typically used to seal and/or mate with a shaft, axle or rotor and move in parallel with the plane of the seal, the membrane is prone to many of the same disadvantages as metal strip seals as they are subject to high wear and permanent deformation or breakage under stress (especially when they are placed exterior to the brush).

What is needed is an improved seal that provides the flexibility and long life reliability of brush combined with impermeability of a plate or membrane barrier that will deliver effective, consistent sealing over several plant maintenance cycles.

SUMMARY

The present invention is directed to a brush seal with a sealing membrane with enhanced stress or deflection accommodating capabilities providing improved sealing in high temperature brush seal applications. Brush seal includes a plurality of sets of brush bristles carried by a spine that can also carry the sealing membrane. In one embodiment, bristle filaments are folded around a core wire to form a pair of sets of brush bristles with at least one sealing membrane layer extending outwardly between the sets of brush bristles. Sealing membrane and the bristles are made of a material capable of withstanding 700° Fahrenheit for high temperature use. To provide improved stress and/or deflection accommodation, the sealing membrane can be made of a relatively thin material, such as a material having a thickness less than bristle width or diameter.

Sealing membrane is of a longitudinally extensible construction helping to accommodate stress and/or deflection, such as during brush seal manufacture and operation. Further imparting brush seal stress and/or deflection accommodation is an overlapping sealing membrane construction where one part of the sealing membrane transversely overlaps another portion of the sealing membrane. In one embodiment, the two overlapping sealing membrane portions are disposed in contact and capable of slidable relative movement.

One preferred embodiment of a sealing membrane is formed of at least a plurality of overlapping sheets that have adjacent portions overlapping in a longitudinal direction allowing relative movement between the sheets in accommodating stress and/or deflection. Sealing membrane can be further configured to transversely overlap to provide additional stress and/or deflection accommodation.

In another preferred embodiment, sealing membrane has a plurality of spaced apart deformation regions deforming membrane transversely outwardly pre-deforming the sealing membrane before brush seal assembly in a manner that enables stretching stress to stretch the membrane at least slightly. Sealing membrane can be further configured to transversely overlap to provide additional stress and/or deflection accommodation. Such deformation regions can be alternating in a manner that can impart a zig-zag, undulating or even a generally sinusoidal shape to the membrane. In one preferred embodiment, the sealing membrane is fluted substantially along its entire length thereby decreasing its length from the original length of the sheet or foil material used to make the membrane. Such a decrease in length permits membrane extensibility in response to stress, including stress resulting from transverse bristle deflection that can occur during brush seal operation. Such a sealing membrane can be further configured to transversely overlap to provide additional stress and/or deflection accommodation.

In one brush seal embodiment, spine, core wire, bristles and sealing membrane are made of a temperature resistant material capable of withstanding 700° Fahrenheit temperature brush seal operation. Membrane is made of a relatively thin metallic foil capable of being deformed around at least a portion of a single bristle facilitating stress and/or deflection accommodation. In one embodiment, membrane has a relatively thin thickness that is no greater than bristle width or diameter. In one preferred embodiment, the membrane thickness is less than bristle width or diameter. Embedding the membrane between a pair of sets of bristles enables the bristles to support such a relatively thin, flexible and deformable membrane during brush seal operation.

Brush seal can be mounted in a holder of removable construction. Such a holder can be configured to removably clamp a holder between a pair of legs with the holder capable of biasing the brush seal into sealing contact. Such a holder can include a biasing arrangement that allows movement of the holder relative to the structure to which it is mounted. Such a biasing arrangement can include a spring having a torsion coil and at least one biasing leaf in contact with part of the holder to urge the holder to extend the brush seal outwardly into sealing engagement. Such a spring can have a plurality of such biasing leafs in contact with spaced apart portions of the holder with the coil carried by a portion extending from the surface to which the holder is mounted.

Holder can be configured to clamp a brush seal by its spine or another portion of the brush seal. Holder can also be configured to orient the brush seal at an angle, such as an acute angle, with the surface against which the bristles bear against during brush seal operation. While the holder can be of removable construction, brush seal can be welded or even adhesively attached to the holder, if desired.

A holder arrangement can include a plurality of holders capable of holding a plurality of brush seals in tandem providing redundant sealing. Such a holder arrangement can space apart the brush seals to provide a dead space between that can further improve sealing.

A brush seal constructed in accordance with the present invention is well suited for use in regenerative air heater or preheater high temperature sealing applications. Such a brush seal configured for high temperature sealing use is also well suited for other high temperature sealing applications including other heat exchanger sealing applications.

DRAWING DESCRIPTION

One or more preferred exemplary embodiments of the invention are illustrated in the accompanying drawings in which like reference numerals represent like parts throughout and in which:

FIG. 1 is a partially exploded perspective view of a brush seal and holder constructed in accordance with the present invention;

FIG. 2 is a front elevation view of the brush seal and holder arrangement of FIG. 1 with the holder mounted to one structure and the brush seal sealing against an adjacent that is movable relative to the brush seal;

FIG. 12 is a side elevation view of a sheet from which the membrane of FIG. 7 can be made;

FIG. 13 is a side elevation view of a layer of the membrane of FIG. 7 right after being formed from the sheet shown in FIG. 12;

FIG. 14 is a side elevation view of the membrane layer of FIG. 13 after brush seal assembly showing stress and deflection accommodation that occurred during brush seal assembly;

Figure 3A:
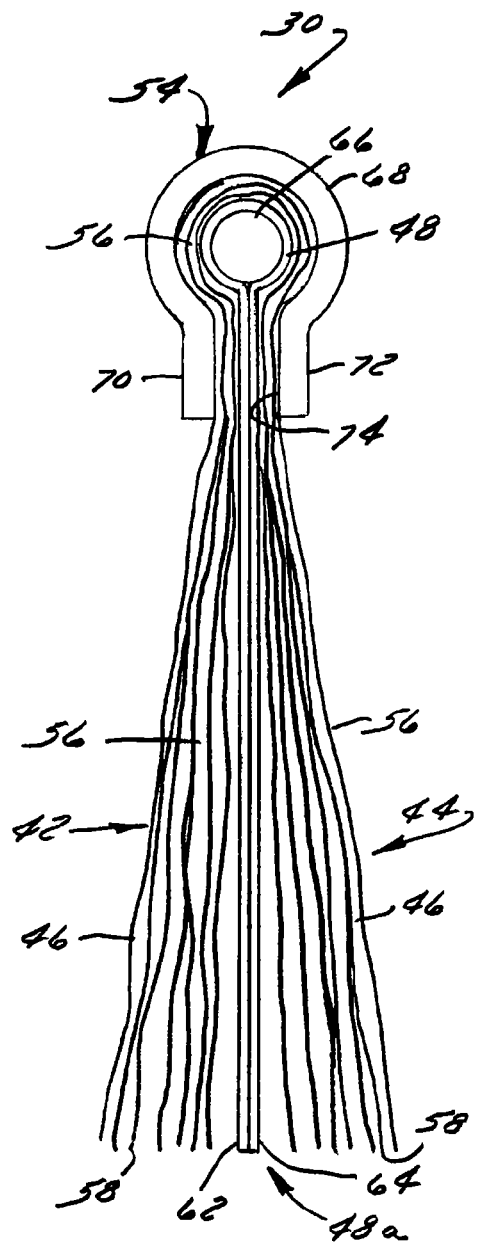
FIG. 3A is an end elevation view of a brush seal constructed in accordance with the present invention having a stress and deflection accommodating membrane with overlapping membrane layers having the same length as the brush bristles with membrane layer thickness exaggerated for clarity.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

FIGS. 1-4C illustrate one preferred embodiment of a brush seal 30 constructed in accordance with the present invention, mountable in a holder 32 attached to one structure 34 (FIG. 2) that is configured to support the brush seal 30 in a manner that enables it to seal against an adjacent structure 36 (FIG. 2), such as divider wall 38 of a regenerative air heater 40 used in a power plant (not shown). A brush seal 30 constructed in accordance with the present invention has a plurality of bristle sets 42, 44 that each includes a plurality of pairs, i.e., at least three, of bristles 46, and a relatively thin, flexible and stress and deflection accommodating sealing membrane 48 embedded in the bristles 46. Such a sealing membrane 48 improves sealing and is configured to accommodate stress and deflection, including during brush seal manufacture, installation, use and/or operation. Brush seal life can also be advantageously increased. Brush seal integrity can be improved. Brush seal integrity can also be maintained for a longer period of time.

Such a holder 32 can include a biasing arrangement 50 with a biasing element 52 resiliently biasing bristles 46 of the brush seal 30 into contact with the underlying structure 36 by helping to compensate for bristle wear during operation. Holder 32 can be of removable construction that allows it to be removed from structure 34. Holder 32 can be configured to removably hold the brush seal 30. Brush seal 30 can also be fixed, such as by being welded to the holder, to structure 34, or the like.

Although holder 32 is shown orienting bristles 46 of brush seal 30 generally perpendicular to sealing surface 60 of structure 60 against which brush seal 30 seals, holder 32 can be configured to orient the brush 30 at an angle relative to surface 60. For example, it is contemplated that holder 32 be configured with a bend or angle that correspondingly orients bristles 46 of brush seal 30 at an angle with surface 60 that can be an acute angle as this can help optimize sealing.

Although such a resilient stress and deflection accommodating membrane-embedded brush seal 30 constructed in accordance with the present invention is particularly well suited for use in regenerative air heater sealing applications and other preheater sealing applications; it can also be used for other high temperature gas sealing applications. For example, a brush seal 30 constructed in accordance with the present invention is particularly well suited for any application in which the brush seal 30 is positioned between two relatively moving structures, e.g., structures 34 and 36 of FIG. 2, where gas flow past or through the brush seal 30 is sought to be opposed.

In the brush seal embodiment shown in FIG. 3A, brush seal 30 includes an elongate spine 54 that holds elongate brush filaments 56 and sealing membrane 48a formed around a core wire 66 in a manner that defines brush bristles 46 and embeds membrane 48a in bristles 46 in a manner that supports membrane 48a. Spine 54 can be configured with a rounded, squared or otherwise enlarged head 68 from which a pair of outwardly extending flanges 70, 72 extend defining a channel 74 from which bristles 46 and membrane 48 extend outwardly. Flanges 70, 72 help support the filaments 56 while also helping to impart strength and structural rigidity to the brush seal 30. Flanges 70, 72 also help clamp and secure the filaments 56 and membrane 48. Such a brush seal 30 can be mounted in a holder, such as holder 32, typically via its spine 54, with at least the tips or ends 58 of its brush bristles 46 disposed in engagement with an adjacent surface 60 of structure 36, e.g., regenerative air heater dividing wall 38.

Figure 3B:
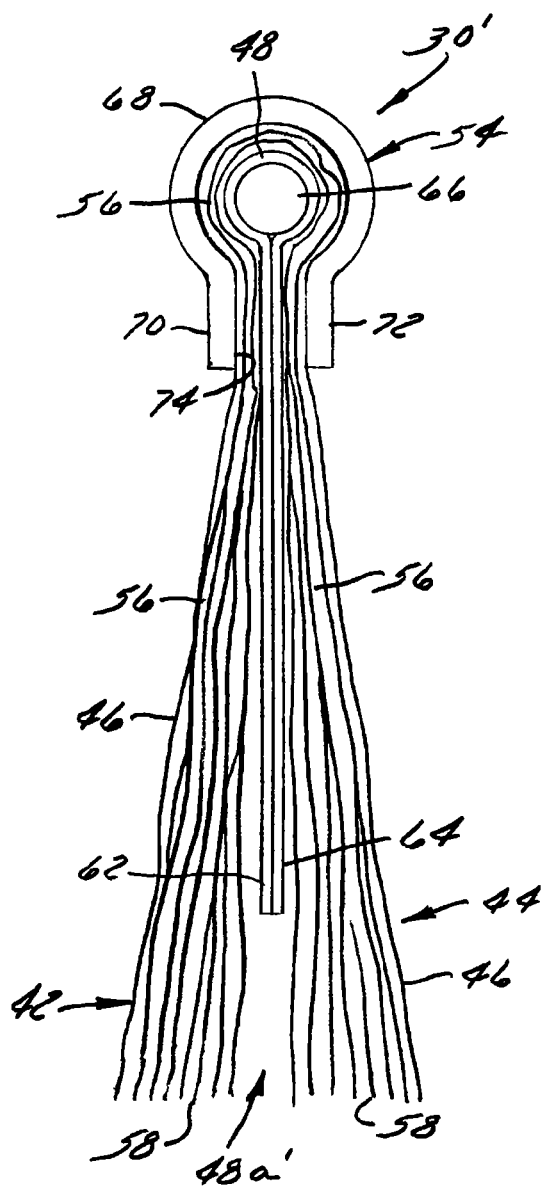
FIG. 3B is an end elevation view of another brush seal where the membrane layer length is less than bristle length.

While brush seal 30 can be configured with a relatively thin and flexible sealing membrane 48a having a length substantially same as bristle length, such as shown in FIG. 3A, brush seal 30' can be configured with a sealing membrane 48a' having a length less than bristle length, as depicted in FIG. 3B. In one such embodiment, membrane 48a' can be configured to have a length of at least two thirds of bristle length and at least one quarter inch less than bristle length. In another such embodiment, membrane length is between about two-thirds bristle length and one-half inch less than bristle length. Providing a membrane length shorter than bristle length can help extend brush seal life by allowing some sacrificial bristle wear to occur before the shorter sealing membrane 48a' is subjected to abrasive contact. This can also increase the length of time brush seal performance is most optimal.

FIGS. 4A-4C, 5 and 6 show in more detail one preferred embodiment of a stress and deflection accommodating sealing membrane 48a used in a brush seal 30 constructed in accordance with the present invention. Membrane 48a is constructed of a plurality of flexible membrane sheets 76a and 76b that each have a portion that overlaps along a longitudinally extending overlap region, R, permitting relative movement, e.g., sliding, to occur between sheets 76a and 76b. This provides extensibility to the membrane 48a in response to stretching stresses that can be encountered, even in a local region of the brush seal, during brush seal manufacture and/or operation. Each sheet 76a and 76b can be disposed in contact with one another in the overlap region, R, such as is shown. This can accommodate stress in a longitudinal direction, e.g., stretching stress, which tends to occur during brush seal manufacture and that would otherwise tend to tear a membrane formed of a single continuous straight sheet by simply displacing, e.g., sliding, one of the sheets 76a and 76b relative to other one of the sheets 76a and 76b in response to encountering such stress. Because of the region, R, of overlap between membrane sheets 76a and 76b, at least some overlap is maintained when such stress is encountered thereby helping maintain the membrane sealing integrity.

In addition, each membrane sheet 76a and 76b is overlapped upon itself in a transverse direction relative to spine 64, which can help provide sealing redundancy. Overlapping each sheet 76a and 76b upon itself results in membrane 48a having a pair of outwardly extending sealing membrane layers 62 and 64 embedded in bristles 46 with each layer 62, 64 helping to independently improve sealing while also working together to improve sealing. As is also shown, each sheet 76a and 76b can be in slidable contact with itself in the region where it has been transversely overlapped upon itself.

This dual overlapping sealing membrane construction 48a also enables a brush seal 30 constructed in accordance with the present invention to better accommodate localized stresses caused by bristles 46 encountering something upraised, such as a piece of debris, that displaces some bristles 46 in a direction generally perpendicular or transverse to the spine 54. As this occurs, a portion of the sealing membrane 48a in the vicinity of the displaced bristles 46 is displaced as those bristles 46 are displaced. As a result of the overlapping sealing membrane sheet construction, membrane sheets 76a and 76b can move relative, e.g., slide, one another in the region, R, of overlap to accommodate stress created by localized brush bristle deflection without resulting in membrane sheet tearing. In addition, each overlapped layer 62 and 64 of each sheet 76a and 76b can also slide relative one another in response to such deflection thereby further helping to prevent and/or minimize stress buildup in the membrane 48a in the region of such deflection.

Figure 4A:
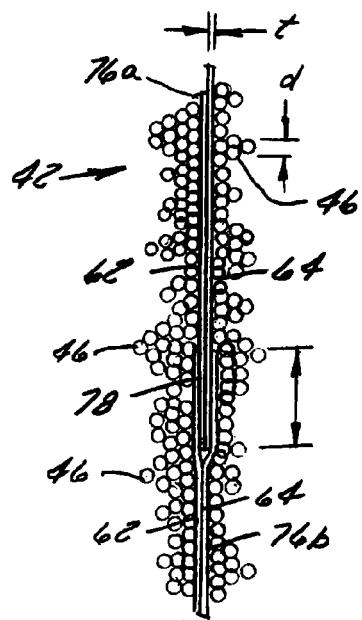
FIG. 4A is a fragmentary sectional plan view of one preferred embodiment of a brush seal constructed in accordance with the present invention taken along lines 4-4 of FIG. 2 illustrating one preferred embodiment of the stress and deflection accommodating membrane formed of a plurality of overlapping membrane sheets.
Figure 4C:
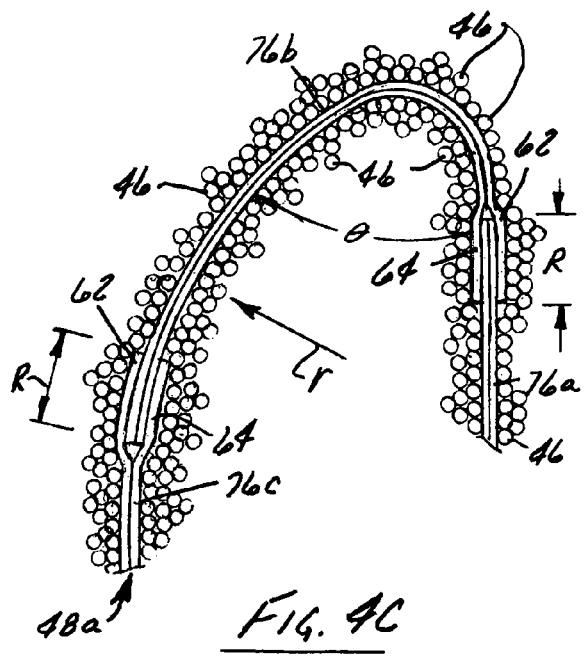
FIG. 4C is a third fragmentary sectional plan view of the brush seal of FIG. 2 after being bent about a radius of curvature and at an acute angle further illustrating the stress and deflection accommodating membrane properties of the brush seal.

Such overlapping can also permit bending of the brush seal 30, such as in the curved manner depicted in FIG. 4C, including about a radius of curvature, r, without tearing or otherwise pulling apart the sealing membrane 48a as overlap between the sheets 76a and 76b permits them to slide relative one another during bending of the brush seal 30. When the brush seal 30 is bent, it simply reduces the region of overlap, R, between the sheets 76a and 76b in and/or along the area of the bend.

Each sealing membrane sheet 76a and 76b can be of imperforate construction such that the resultant sealing membrane arrangement 48a formed from the overlapping sheets 76a and 76b is also substantially imperforate. In the embodiment shown in FIGS. 4A-4C, 5 and 6, each sealing membrane sheet 76a and 76b is imperforate and embedded within brush bristles 46 such that the seal provided by bristles 46 is enhanced by the sealing membrane 48a during brush seal operation.

Membrane 48a is made of a material and/or configured to be flexible and deformable enabling the membrane 48a to deform around a portion of a plurality of bristles 46. Membrane 48a preferably is of relatively thin, flexible, deformable and resilient construction as a result of each membrane layer 62 and 64 being thin relative to brush bristle width or diameter, its overlapping construction, and the membrane material. As a result of being so thin, membrane 48a is supported on both sides by bristles 46 of each bristle set 42 and 44.

Membrane 48a can be thin relative to the width or diameter of brush bristles 46 with each membrane layer 62 and 64 having a thickness, t, no greater than about the width or diameter, d, of a bristle 46. Bristle diameter, d, can range from 0.003 inches to 0.20 inches and membrane thickness, t, of each membrane layer can range from 0.00025 to 0.0008 inches. In the embodiment shown in FIGS. 4A and 4B, each layer 62 and 64 has a thickness less than bristle width or diameter, d. For example, in one preferred embodiment, each bristle 46 has a round cross section with a diameter, d, of 0.008 inches and each layer 62, 64 of the membrane 48a has a thickness, t, of 0.0005 inches. In another preferred embodiment, each bristle 46 has a width or diameter, d, less than the thickness of the membrane 48a. For example, where each membrane layer 62 and 64 has a thickness, t, of about 0.0005 inches, a membrane 48a having a pair of layers 62, 64 has a total membrane thickness, 2t, of no greater than about 0.001 inches, which is less than the bristle diameter, d, of 0.008 inches.

Figure 4B:
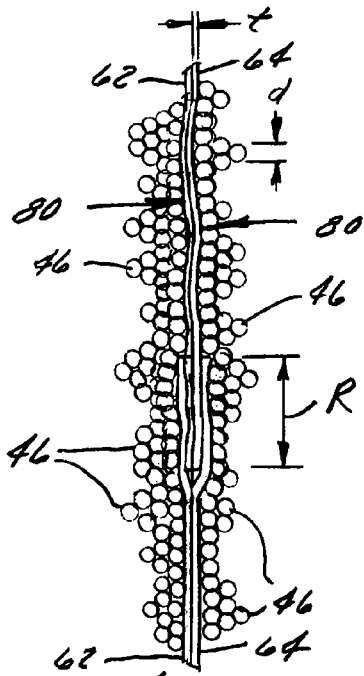
FIG. 4B is a second fragmentary sectional plan view of the brush seal taken along lines 4-4 of FIG. 2 illustrating the membrane accommodating some stress or bristle deflection.

In one embodiment, membrane 48a has such a relatively thin cross-sectional thickness enabling membrane 48a to deform around at least a portion of a plurality of bristles 46. For example, as is shown in FIG. 4B at reference numeral 80, membrane 48a can be thin enough to deform around a portion of a single bristle 46. Being so thin and so deformable, a greater surface area of the membrane 48a remains in contact with bristles 46 during brush seal operation, minimizing the amount of membrane surface area exposed to the environment, namely gas on either side of the brush seal 30. Such an arrangement advantageously maximizes brush seal life by minimizing the effects of heat and the environment on the membrane 48a, thereby minimizing membrane oxidation. This advantageously increases sealing membrane life and hence increases brush seal life.

Such sealing membrane deformability helps brush seal 30 to better seal against a surface, such as surface 60, that has surface irregularities, carries debris, or otherwise deviates from flat or uniform. Such deformability also helps sealing membrane 48a to withstand such surface irregularities or deviations that cause one or more bristles 46 to displace or deform in turn deforming membrane 48a. In addition, membrane 48a can displace in unison with a group of bristles 46 as well as with substantially all of the bristles 46 thereby also maximizing sealing where force is applied against the brush seal 30 including where the brush seal 30 is disposed at an angle to the surface against which the bristles 46 make sealing contact. Such sealing membrane deformability also helps improve sealing while also enhancing sealing integrity.

The use of such a thin, flexible and deformable membrane 48a enables the brush seal 30 to be bent, such as to or about a radius of curvature, r, like that shown in FIG. 4C. The overlapping construction of the sealing membrane 48a further helps the brush seal 30 to be bent such that the bend even encompasses an acute angle, θ. In a preferred embodiment, θ can range from less than 90° to as small as 5°. As a result of the flexibility and deformability of the membrane 48a along with the segments where adjacent membrane sheets 76a, 76b and 76c overlap, a brush seal 30 constructed in accordance with the present invention can be bent at such a sharp angle without tearing and while maintaining its seal.

Figure 5:
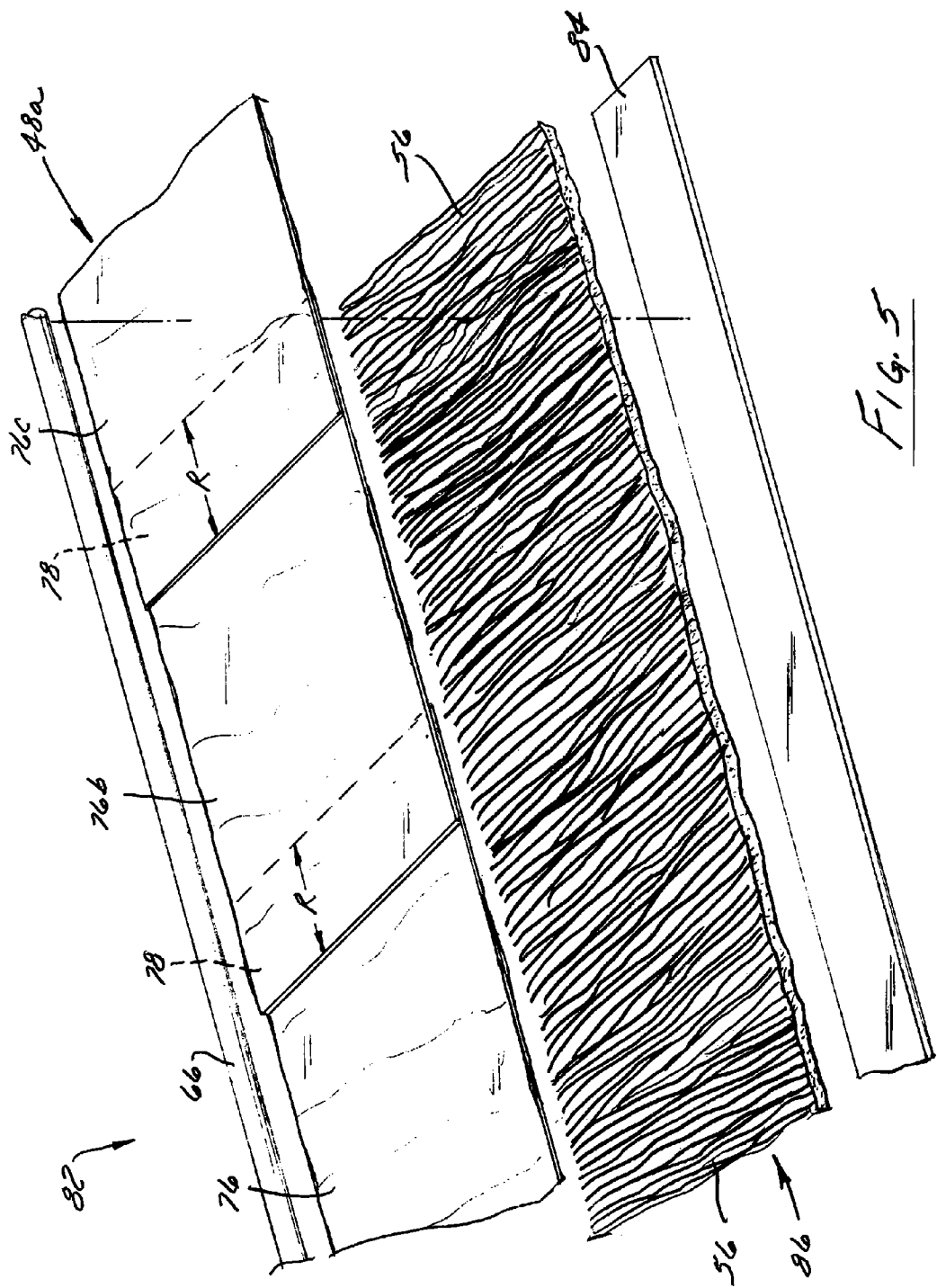
FIG. 5 is an exploded perspective view of components from which a brush seal embodiment in accordance with FIGS. 4A-4C can be constructed.

FIG. 5 illustrates the components 82 used to make a preferred high temperature brush seal embodiment capable of use in the manner the manner depicted in FIGS. 1-4C. The brush seal components include an elongate strip 84 of formable material, such as a generally rectangular strip metal, that is formed into spine 54 as part of or during brush seal construction. Such a strip 84 can be unrolled from a roll or the like, can be extruded, or provided in another form. In one preferred embodiment, the strip 84 is made of a high temperature resistant material that is resistant to temperatures of between 400° and 1000° Fahrenheit, suitable for use in high temperature brush sealing applications. In one preferred embodiment, the strip 84 is made of a stainless steel capable of withstanding such high temperatures. Other suitable materials include titanium, aluminum, steel, or an alloy thereof, e.g., Cor-Ten, Haynes or Inconel, possessing high temperature properties suitable for use for the intended high temperature sealing application. Examples of some suitable alloys include Haynes 25, Incoloy 800, Inconel 625 or Inconel 718.

Core wire 66 can be an elongate rod made of a similarly suitable high temperature resistant material. For example, one preferred material is a metal capable of resisting temperatures of between 400° and 1000° Fahrenheit and can be of metallic construction. One preferred metallic material is a stainless steel, titanium, a titanium alloy, aluminum, an aluminum alloy, a high temperature steel alloy or the like. Examples of some suitable alloys include Haynes 25, Incoloy 800, Inconel 625 or Inconel 718. Such a core wire 66 can be configured with a suitable width or diameter so as to help enable bristle filaments 56 to be formed around core 66 in a manner where bristles 46 of each bristle set 44, 46 are sufficiently deformed during manufacturing so as to abut against or contact membrane 48a. Such deformation can be plastic in nature thereby plastically deforming at least some filaments 56 around core wire 66.

Bristle filaments 56 can also be made of a similarly suitable high temperature material. As is shown in FIG. 5, during brush seal assembly, filaments 56 are arranged in an elongate mat 86 with the mat 86 having a thickness of at least a plurality of pairs of filaments thick. As best depicted by the single filament 56 set off from the mat 86 in FIG. 4, each filament 56 is elongate and can be of non-straight construction. For example, each filament 56 can be generally sinusoidal in shape along its length and can improve performance. Each filament 56 can be made of a metallic material, such as a stainless steel or another suitable high temperature alloy such as Haynes 25, Incoloy 800, Inconel 625 or Inconel 718.

Membrane 48a is formed of a plurality of thin, flexible and deformable membrane sheets 76a, 76b, and 76c, also made of a similarly suitable high temperature resistant material. In one preferred embodiment, membrane 48a is formed of at least a plurality of pairs of membrane sheets 76a, 76b, and 76c. Each membrane sheet 76a, 76b and 76c can be made of a relatively thin foil having a relatively cross sectional thickness in accordance with that discussed above. Each sheet 76a, 76b, and 76c can be of generally rectangular construction and can be generally square if desired.

Each membrane sheet 76a, 76b and 76c can be made of a material capable of operating at temperatures of at least between 400° and 1000° Fahrenheit. One preferred membrane sheet material is stainless steel foil. Examples of other materials capable of producing a suitably thin and high temperature foil include Haynes 25, Incoloy 800, Inconel 625, and Inconel 718.

In assembly, membrane sheets 76a, 76b and 76c are overlapped in a longitudinal direction, such as depicted in FIG. 5, during brush seal manufacture with a portion of each adjacent membrane sheet 76a, 76b and 76c, creating region, R, of sealing overlap 78. In one preferred embodiment, each membrane sheet 76a, 76b, and 76c has a region of overlap, R, which is at least one-sixteenth of an inch to help accommodate deflection of brush bristles 46 during brush seal operation. In another preferred embodiment, the region of overlap, R, is at least one quarter of an inch. This advantageously permits relative movement between adjacent membrane sheets, e.g., sheets 76a, 76b and/or 76c, in the vicinity of the deflection while maintaining at least some overlap along with the integrity of the seal provided by the membrane 48a. Overlapping sheets 76a, 76b and/or 76c in forming membrane 48a also enables membrane 48a to withstand stresses, including stretching stresses, the membrane 48a and/or brush seal 30 may be subject to during manufacture.

Figure 6:
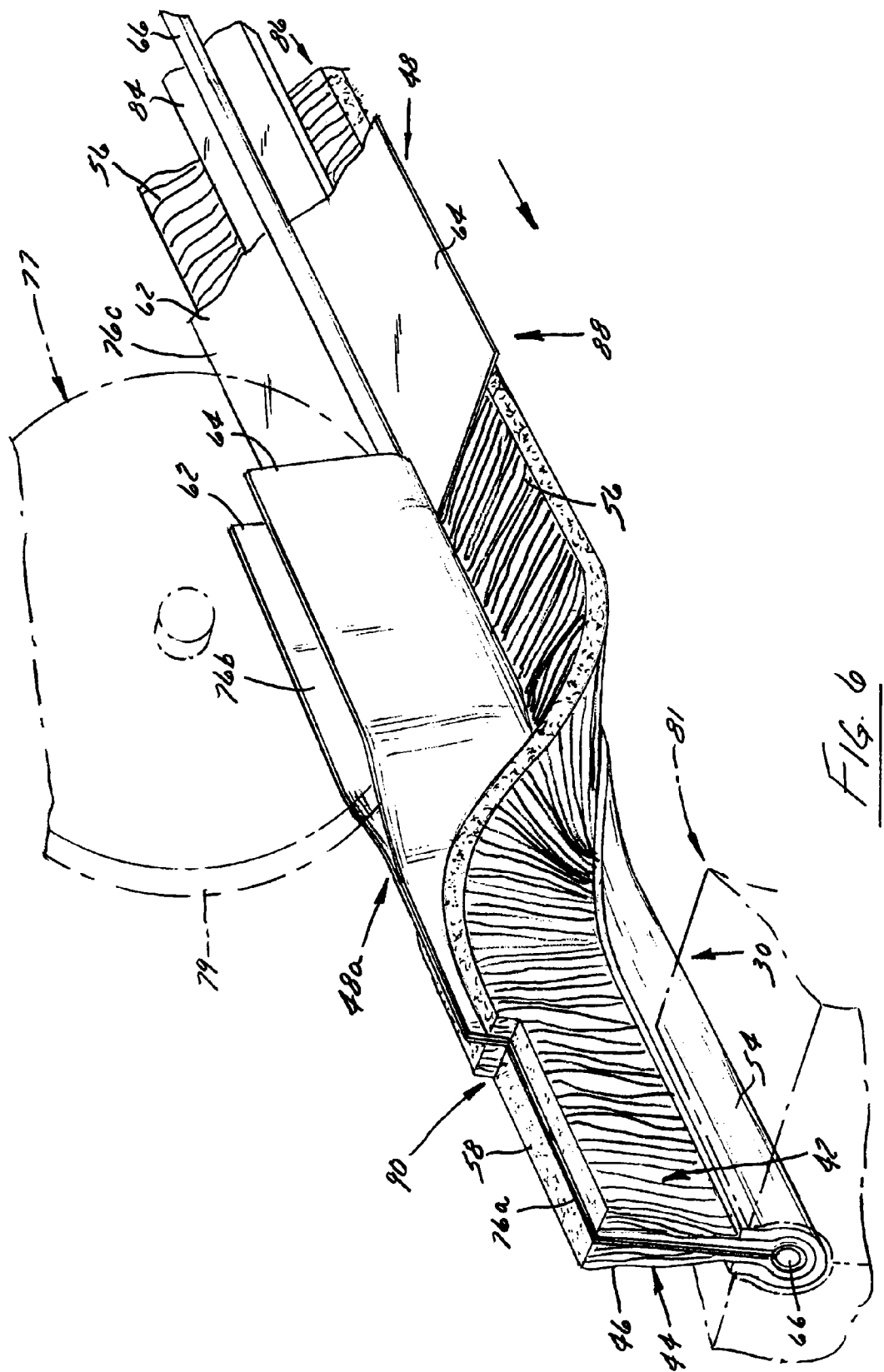
FIG. 6 is a perspective view depicting one preferred method of making a brush seal using the components in FIG. 5.

The manner in which the brush seal 30 can be manufactured can be understood with reference to FIG. 6. First, the mat 86 of elongate brush filaments 56 is laid down onto strip 84 with the centers of the filaments 56 generally bisecting the strip 84. Flat membrane sheets 76a, 76b and 76c are placed on the filament mat 86. The membrane sheets 76a, 76b, and 76c are discrete and laid down in an overlapping fashion as mentioned above. Core wire 66, which may be unwound from a continuous roll, is then placed on top of the membrane sheets 76a, 76b and 76c in the middle or bisector of the metal strip 84. This forms a brush seal assembly arrangement 88 that is ready to be formed into the brush seal 30.

A forming operation is then performed to shape the strip 84 into the spine 54 by crimping the strip 84 around the membrane sheets 76a, 76b and 76c, the brush filaments 56, membrane sheets 76a, 76b, and 76c and the core wire 66. Such a forming operation can be formed using a rotating forming mandrel or disk 77 (shown in phantom in FIG. 6) with a grooved outer edge 79 that presses down on the core wire 66 applying force against the strip 84 overlying a grooved or recessed crimping die or fixture 81 (also shown in phantom in FIG. 6) sufficient to deform the strip 84 and form it into spine 54. As the strip 84 is crimped and formed into the spine 54, it clamps and forms the membrane sheets 76a, 76b and 76c along with the brush filaments 56 around the core wire 66. During forming, the unformed brush seal assembly arrangement 88 is substantially continuously advanced toward the disk 77 thereby substantially continuously forming an elongate brush seal 30 that can then be cut to a desired length or lengths depending on the requirements of the application or installation in which the brush seal 30 is going to be used.

During manufacture, the brush seal assembly arrangement 88 advances toward the forming disk 77. The rotating forming disk 77 causes the core wire 66 to be progressively pressed down; thereby forcing a corresponding underlying portion of the strip 84 into a recess 83 in the crimping die or fixture 81 deforming the strip 84 into the spine 54. As the strip 84 is forced into the crimping fixture recess 83, it is crimped causing each membrane sheet 76a, 76b, and 76c and the filaments 56 to be folded around the core wire 66. This causes one set 42 of brush bristles 46 to be disposed on one side of membrane sheets 76a, 76b, and 76c and another set 44 of brush bristles 46 to be disposed on the other side of the membrane sheets 76a, 76b, and 76c with each membrane sheet 76a, 76b, and 76c folded substantially in half over itself. When the crimping process is completed, the spine 54 is crimped around the filaments/bristles and membrane sheets 76a, 76b and 76c securing them around the core wire 66. The filaments 56 as well as the membrane sheets 76a, 76b, and 76c can then be trimmed to length, such as is depicted in FIG. 5 at reference numeral 90, in a trimming operation.

Forming a brush seal 30 in this manner applies considerable tensile stress on the elongated elements including in particular the membrane 48a. By being able to use a thinner membrane 48a with layers 62, 64 that each can have a thickness less than brush bristle diameter, cost is reduced while sealing integrity is enhanced. However, subjecting such a relatively thin membrane to such stress increases the risk of tearing during brush seal manufacture that forming the membrane 48a out of overlapping sheets 76a, 76b, and 76c prevents tearing from occurring. This is because each membrane sheet 76a, 76b, and 76c can slip or otherwise move in a longitudinal direction in its region of longitudinal overlap relative to the spine 54 during manufacture, preventing excessive tensile stress buildup and tearing from occurring while producing an elongate membrane 48a that performs as good or better than if it were formed of a single continuous and uninterrupted sheet.

FIGS. 7-14 illustrate various aspects of another preferred brush seal embodiment, including a method of making a brush seal 30" constructed in accordance with the present invention that is suitable for high temperature applications and which also better accommodates stress and deflection. Brush seal 30" is similar to brush seal 30 but employs a sealing membrane 48b that is pre-deformed before brush seal assembly in a manner that imparts at least some resiliency thereby enabling the membrane 48b to better accommodate stress and deflection. Such a pre-deformed resilient sealing membrane 48b can be made of the same material or materials as membrane 48a, but differs in that it can be made from a single elongate and flexible sheet 92. Such a sheet 92 can be selected so that the resultant membrane 48b has a cross-sectional thickness no greater than about brush bristle width or diameter or even less than brush bristle width or diameter.

Figure 7:
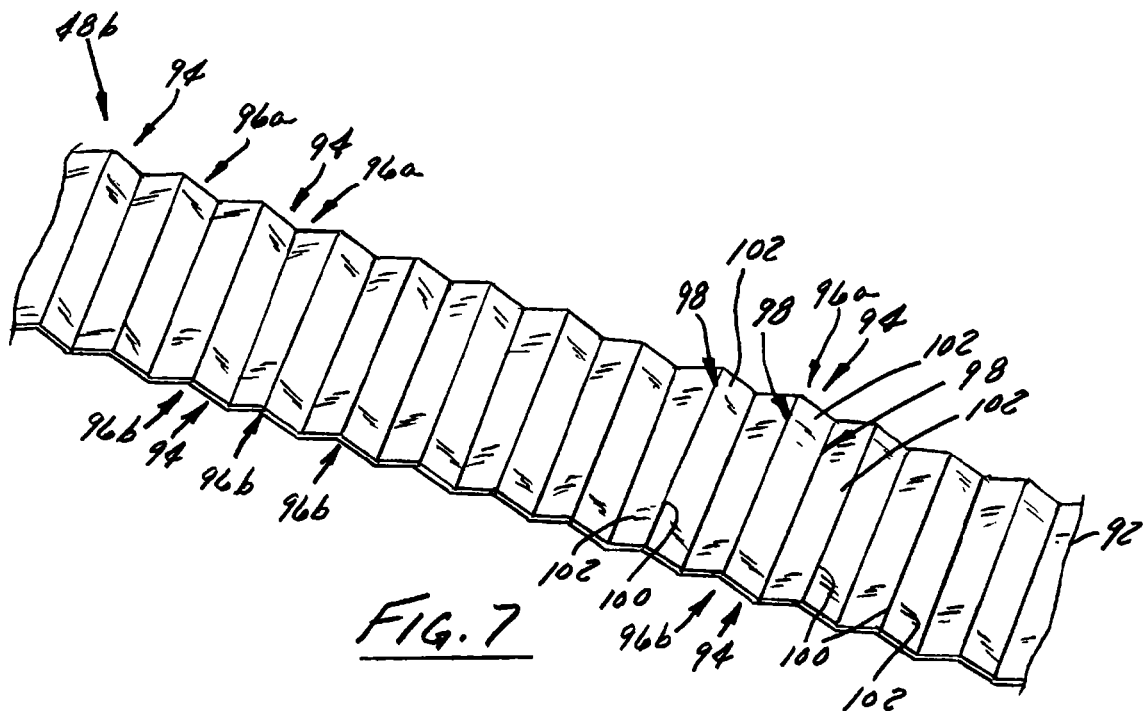
FIG. 7 is a perspective view of a second stress and deflection accommodating membrane having a three-dimensionally contoured stress and deflection accommodating construction.

FIG. 7 illustrates a preferred embodiment of a pre-deformed resilient sealing membrane 48b that is of three-dimensionally contoured construction having at least a plurality of pairs, i.e. at least three, of spaced apart stress and deflection accommodating deformations 94 formed in sheet 92 in making membrane 48b. These spaced apart deformations 94 formed in sheet 92 change the shape memory of the sheet 92 in a desired manner that increases resiliency permitting the membrane 48b to be stretched and/or deflected without tearing, thereby enabling it to better accommodate stress and deflection. In the sealing membrane embodiment depicted in FIG. 7, stress and deflection accommodating deformations 94 are formed in sheet 92 alternately on opposite sides of the sheet 92 substantially along the entire length of the resultant sealing membrane 48b produced. The resultant three-dimensionally contoured sealing membrane 48b provides increased longitudinal extensibility over a sheet 92, even after being embedded in bristles 46 that support membrane 48b.

In FIG. 7, each deformation 94 is in the shape of a transversely extending flute 96a, 96b that are each defined by at least one deformation region 98 extending substantially transversely at least part of the width of the sheet 92. In the sealing membrane embodiment shown in FIG. 7, each transversely extending deformation region 98 can be in the form of a fold line or a fold region extending substantially the width of the sheet 92 indicative of where the sheet 92 has been deformed in a manner that has changed its shape memory in that region. Although each transversely extending deformation region 98 shown in FIG. 7 is represented by a fold line 100, it should be recognized that region 98 can be and typically is wider than a line.

As is also shown in FIG. 7, each deformation region 98 extends outwardly in an alternating fashion thereby imparting a zigzag or wavy shape to the resultant sealing membrane 48b. Where flutes 96a and 96b defined by fold lines 100 are formed to produce a pre-deformed stress and deflection accommodating resilient sealing membrane 48b constructed in accordance with the present invention, the alternate with one flute 96a being upwardly or outwardly facing and adjacent flute 96b being downwardly or inwardly facing as depicted in FIG. 7. Each adjacent pair of fold lines 100 defines a panel 102 that can be generally square or rectangular as shown in FIG. 7 but can differ somewhat depending upon the nature of the deformation process used.

Figure 8:
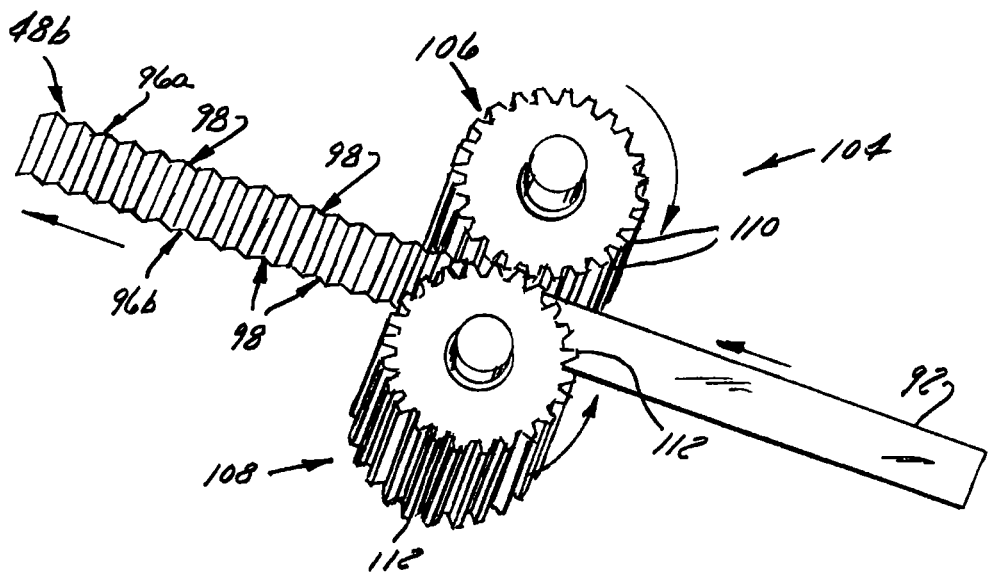
FIG. 8 is a perspective view illustrating a method of making the membrane depicted in FIG. 7.

FIG. 8 illustrates an exemplary but preferred method of making a pre-deformed stress and deflection accommodating resilient membrane 48b utilizing a forming arrangement 104 capable of substantially continuously forming deformation regions 98 in a continuous, uninterrupted substantially planar sheet 92 that can be unrolled from a roll of sheeting material (not shown). The forming arrangement 104 is specifically configured to form flutes 96a, 96b in the sheet 92 but can be configured to produce similarly configured deformation regions 98 that can impart an undulating, wavy, or even a generally sinusoidal shape to the resultant sealing membrane 48b. Forming arrangement 104 includes a pair of flute-forming gears 106, 108 having teeth 110, 112 that intermesh during gear rotation in the manner depicted in FIG. 8 alternately forming flutes 96a, 96b in the sheet 92 as it advances between the gears 106, 108.

Figure 9:
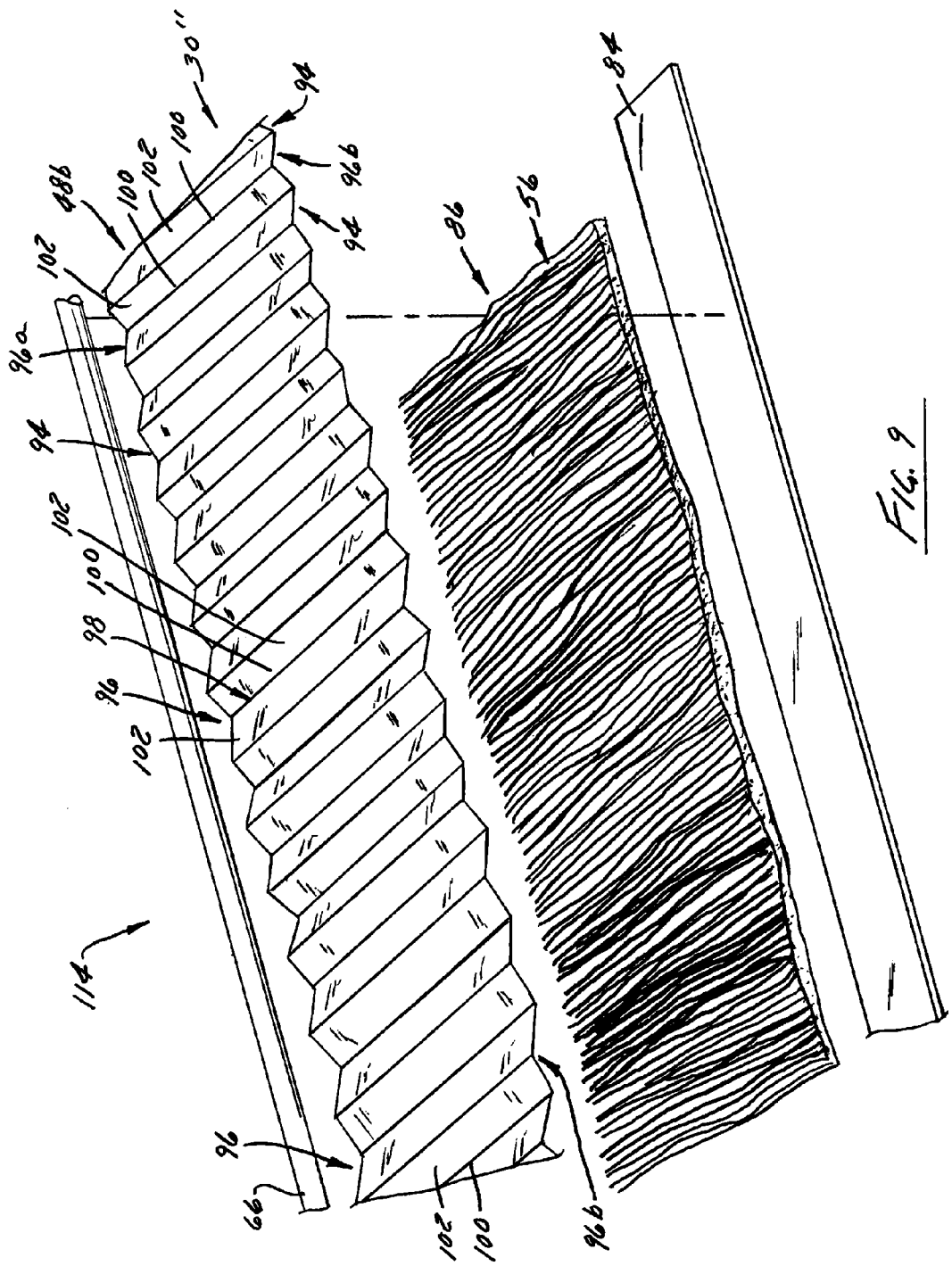
FIG. 9 is an exploded perspective view of components from which another brush seal embodiment using the membrane of FIG. 7 can be constructed.
Figure 10:
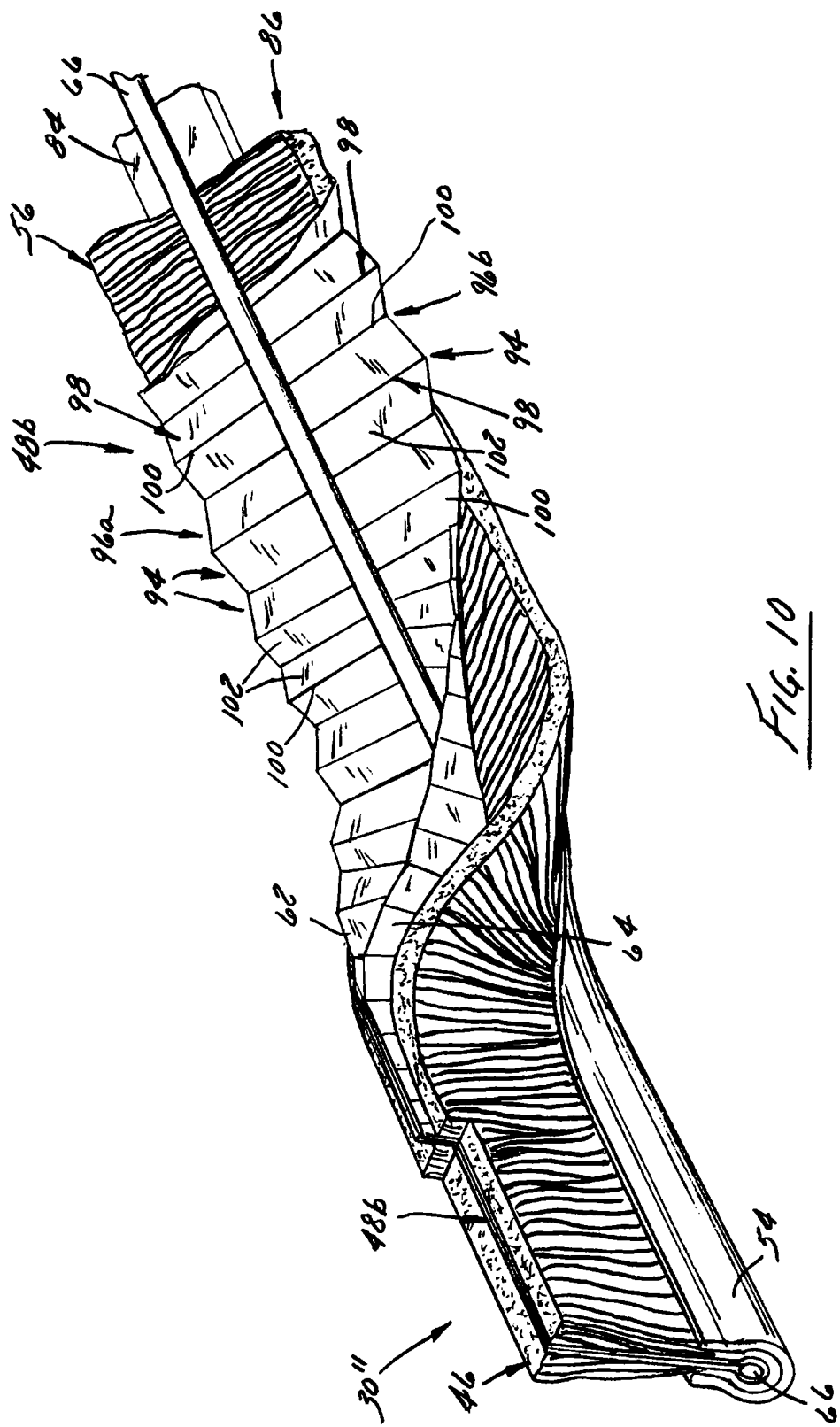
FIG. 10 is a perspective view depicting another preferred method of making a brush seal using the components in FIG. 9.

FIGS. 9-10 illustrate a method of making a brush seal 30' in accordance with the present invention. In this method, a continuous length of pre-deformed stress and deflection accommodating resilient membrane 48b is used because, as will be explained in more detail below, deformation regions 98 allow a relatively thin sealing membrane 48b to be used in a continuous brush seal assembly process without the membrane 48b tearing. It does so because the deformation regions 98 form non-straight portions in the membrane 48b that provide resiliency or some give that helps accommodate stress applied to the membrane 48b during brush seal manufacture.

FIG. 9 illustrates the components 114 of a high temperature brush seal 30" constructed with such a pre-deformed stress and deflection accommodating resilient membrane 48b. These components 114 further include bristle filaments 56, core wire 66 and spine-forming strip 84. FIG. 10 depicts a method of brush seal manufacture where the strip 84, filaments 56, membrane 48b and core wire 66 form an assembly that advances toward a forming mandrel, such as mandrel 77 depicted in FIG. 6, or the like that bends the filaments 56 and membrane 48b around core wire 66 and crimps the strip 84 into spine 54 securing the filaments 56 and membrane 48b in a folded condition around core wire 66 with membrane 48b transversely overlapped upon itself and embedded in bristles 46.

Such a manufacturing method can be continuous with the strip 84 being unrolled from a roll or the like, filaments 56 being continuously stacked in a mat 86 and substantially centered over strip 84 with membrane 48b being continuously overlaid on filaments 56, and core wire 66 being continuously unrolled from a roll or the like so it overlies and is substantially centered over membrane 48b and filaments 56. Membrane 48b can be continuously three dimensionally formed, such as in the manner depicted in FIG. 8, from a sheet 92 that is elongate, continuous and/or uninterrupted (unbroken) producing a three-dimensionally contoured stress and deflection accommodating membrane 48b that is also elongate, continuous and/or uninterrupted. In such an instance, membrane 48b is continuously formed and placed on the filament mat 86.

Thereafter, forming mandrel(s) acting on core wire 66 causes the membrane 48b and filaments 56 to be folded around the core wire 66, while forming strip 84 into spine 54 securing the membrane 48b in place around the core wire 66. A trimming operation can also be substantially continuously performed to cut the bristles 46 and/or membrane 48b to a desired length. For example, as shown in FIG. 10, both the bristles 46 and membrane 48b are substantially simultaneously trimmed so they both have substantially the same length.

Figure 11:
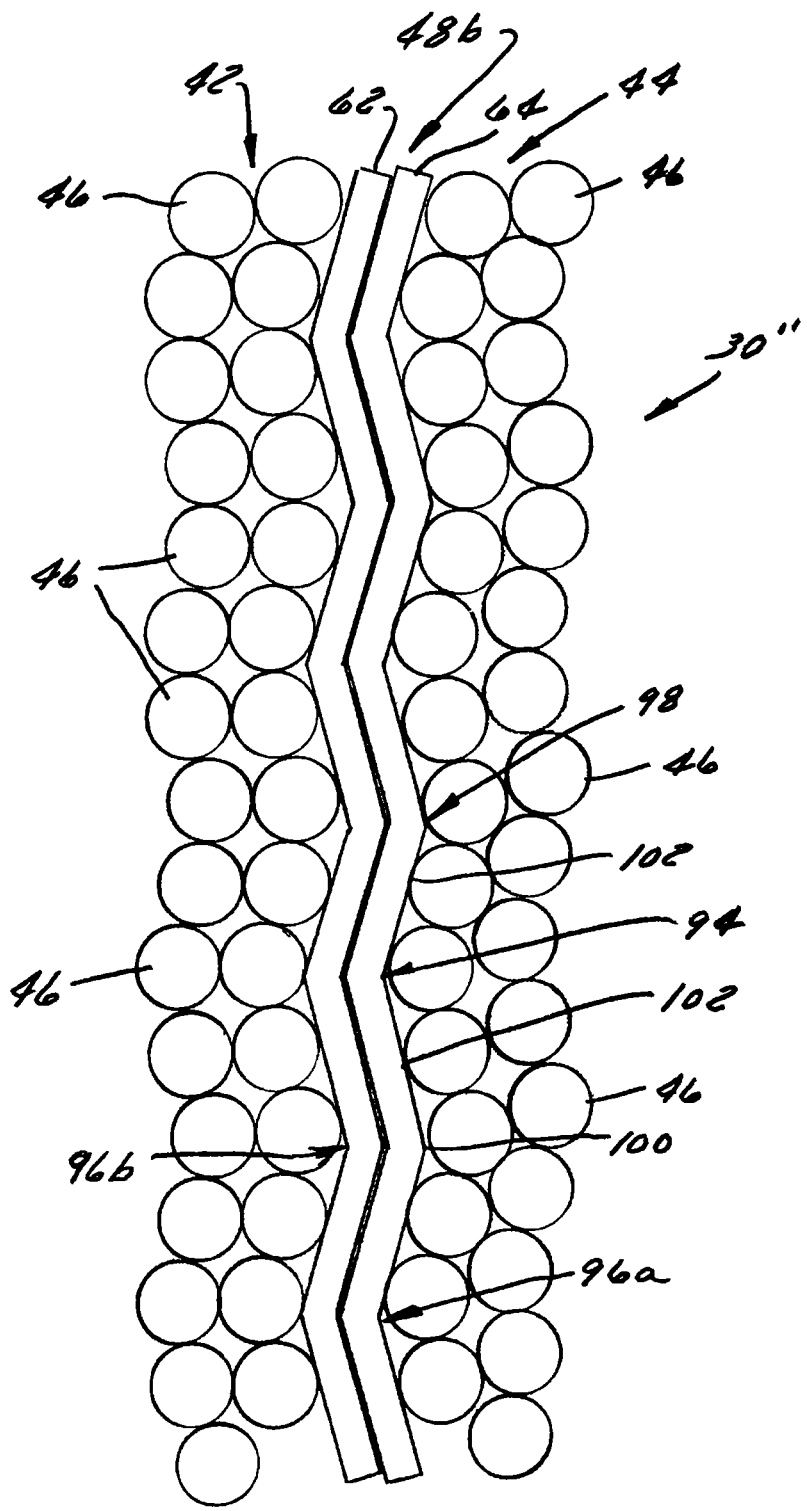
FIG. 11 is a fragmentary bottom plan view of a brush seal constructed with the membrane of FIG. 7.

FIG. 11 illustrates a fragmentary, enlarged portion of a brush seal 30" showing overlapping layers 62, 64 of pre-deformed stress and deflection accommodating resilient membrane 48b embedded in brush bristles 46 and supported by bristles 46. Membrane 48b is made of a flexible and deformable metallic or metal foil with each layer 62, 64 having a cross-sectional thickness less than brush bristle diameter or width. The foil from which membrane 48b is constructed is temperature resistant so as to be capable of withstanding relatively high temperatures found in regenerative air heaters.

FIGS. 12-14 illustrate a single layer sheet 92 prior to its deformation in forming membrane 48b, membrane 48b after it has been formed but prior to brush seal assembly, and membrane 48b after brush seal assembly. As is shown in FIG. 12, foil sheet 92 is generally planar and elongate having a width, $W_1$, that is the same as its cross sectional thickness and a length, $L_1$. As is shown in FIG. 13, after being deformed to form membrane 48b, membrane 48b has a reduced deformed length, $L_2$, which is less than the un-deformed original length, $L_1$, by at least 10%. As a result of being deformed, its deformed width, $W_2$, becomes at least a plurality of pair, i.e., at least three, times greater than sheet width, $W_1$. As is shown in FIG. 14, during brush seal assembly, the amount of deformation of the pre-deformed membrane 48b is reduced such that when embedded between sets 42 and 44 of bristles 46, such as in the manner depicted in FIGS. 10 and 11, its final deformed length, $L_3$, ends up being between $L_1$ and $L_2$ and its final deformed width, $W_3$, is between $W_1$ and $W_2$.

As a result of stress applied to membrane 48b in a longitudinal direction as a result of being unrolled and placed over filament mat 86 and the force resultant from the sets of bristles sandwiching membrane 48b therebetween, the deformed length, $L_3$, is increased from the deformed length, $L_2$, right after deformation and the deformed width, $W_3$, is decreased from the deformed width, $W_2$, right after deformation. This ability of the membrane 48b to physically change its deformed width and length in response to stress evidences its resiliency and ability to withstand stress and accommodate deflection. As a result of deformed width, $W_3$, being at least a plurality of pair, i.e., at least three, of times original sheet thickness, $W_1$, after brush seal assembly, the embedded brush seal 48b is still able to accommodate additional stress and/or deflection. This advantageously increases brush seal life, produces a more durable brush seal 30" and increases brush seal integrity for a longer period of time thereby increasing the effective brush seal life.

Figure 15:
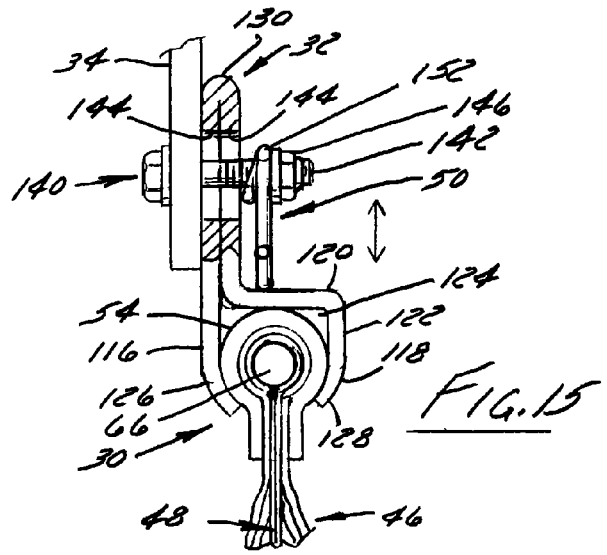
FIG. 15 is a partial sectional view of a brush seal holder embodiment of removable and floating construction.
Figure 16:
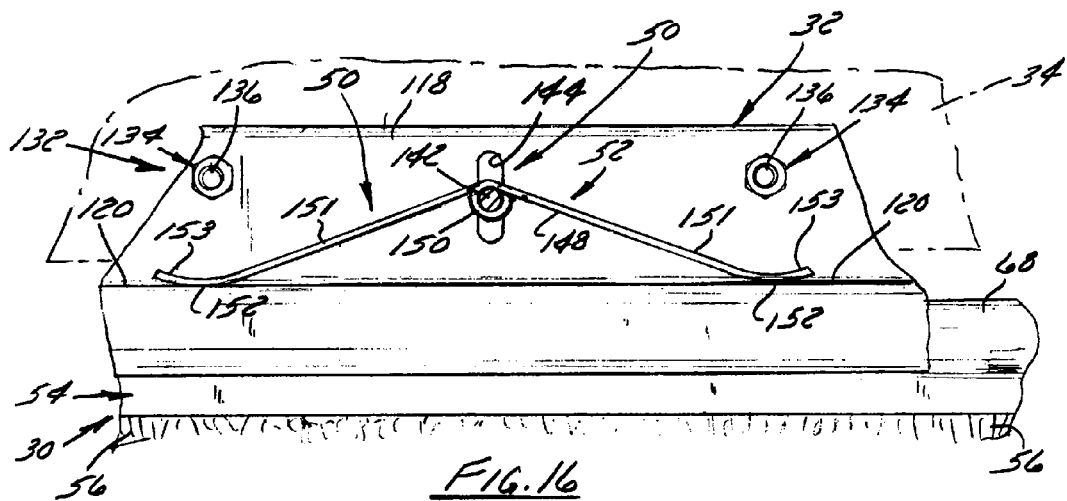
FIG. 16 is a front elevation view of the brush seal holder of FIG. 15 depicting the holder and brush seal in an extended position.
Figure 17:
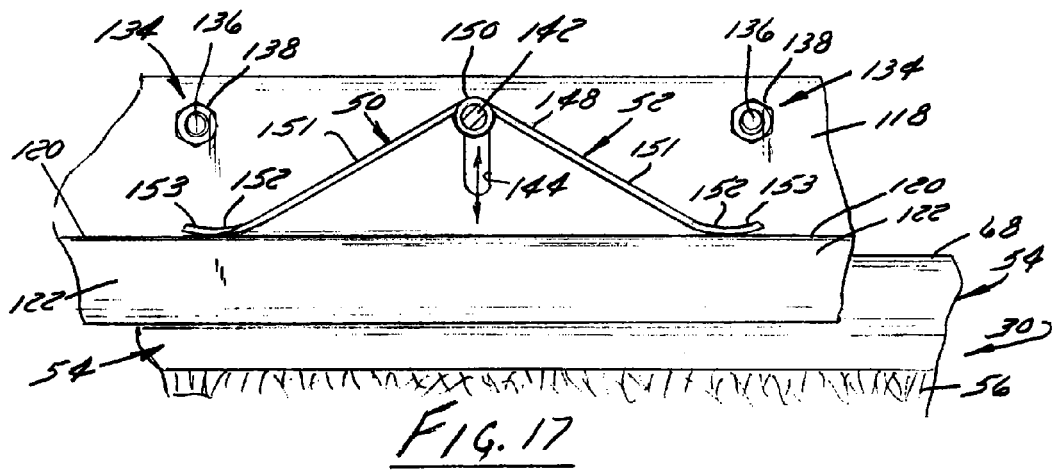
FIG. 17 is another front elevation view of the brush seal holder of FIG. 15 illustrating the holder and brush seal in a fully retracted position.

FIGS. 15-17 illustrate in more detail one embodiment of a holder 32 that can be used to releasably retain a brush seal constructed in accordance with the present invention. Such a holder 32 can be used to attach the brush seal to an underlying element, such as wall 34 of a regenerative air heater or the like. As previously indicated, holder 32 can be configured in a manner that orients brush seal 30 at an angle relative to the surface against which bristles 46 of the brush seal 30 contact. For example, holder 32 can be configured to orient brush seal 30 at an angle ranging from generally perpendicular to the surface against which brush seal 30 seals to being at a right angle relative thereto. Typically, holder 32 is configured to orient brush seal 30 at an acute angle relative to the surface, e.g., surface 60 in FIG. 1, against which the brush seal 30 seals.

Holder 32 can be formed of a single strip of material, such as a stainless steel or other suitable material that is formed, such as by bending, to create a generally h-shaped profile having a first or inner leg 116 and a second or outer leg 118 that has an outwardly extending section 120 and a downwardly extending section 122 that form a channel 124 that releasably receives the spine 54 of a brush seal 30 when the brush seal 30 is attached to the holder 32. The bottom-most end of holder legs 116, 118 can have a respective in-turned flange 126, 128 to help retain brush seal spine 54 in channel 124. Holder legs 116, 118 can be joined at the opposite end such as by a bend 130 that acts as a hinge, e.g., living hinge, enabling one leg 118 to be moved relative to the other leg 116 in clamping spine 54 when attaching brush seal 30 to holder 32. This enables leg 118 to be movable relative to leg 116 between a clamped position, such as the clamped position shown in FIG. 15, and a position disposed from the clamped position where the space between legs 116, 118 is increased, allowing spine 54 of brush seal 30 to be released from holder 32.

Holder 32 includes a clamping arrangement 132 used to releasably hold leg 118 relative to leg 116 in the clamped position shown in FIG. 15 and to release leg 118 from the clamped position to allow spine 54 and hence brush seal 30 to be removed from holder 32. Clamping arrangement 132 can include a plurality of longitudinally spaced apart fasteners 134, 140 used to hold leg 118 in the clamped position. As is best shown in FIGS. 16 and 17, one such fastener 134 can have a stem 136 extending from one leg 116 through an opening in the other leg 118 that receives a nut 138 that engages the stem 136, such as in a threaded manner. Fastener 140 is also used in attaching holder 32 to structure 34. Fastener 140 includes a stem 142 that extends outwardly from structure 34 through an elongate slot 144 in both legs 116, 118 and a nut 146 that can threadably engage the stem 142.

Holder 32 can include a biasing arrangement 50 that resiliently biases or urges brush seal 30 outwardly toward a fully extended sealing position enabling the brush seal 30 to adjust for brush seal wear while maintaining sealing contact with a surface 40 (FIG. 1) of structure 36 (FIG. 1) against which it seals for a longer period of time. Although only one biasing arrangement 50 is depicted, a brush seal 30 can be equipped with a plurality of biasing arrangements 50 spaced apart along the length of the brush seal 30. Biasing arrangement 50 includes a biasing element 52 carried by stem 142, which rides in slot 144, that cooperates with leg 118 of holder 32 to urge holder 32 outwardly toward the structure 36 (FIG. 1) against which brush seal 30 seals in a manner that can allow the brush seal 30 to "float" on structure 36 (FIG. 1). This can help provide a better seal while maintaining seal integrity for a longer period of time. This also enables brush seal position adjustment during preheater operation to accommodate debris on structure 36 and/or discontinuities in structure 36. Useful brush seal life can also advantageously be extended.

Slot 144 extends transversely relative to holder 32 and overlies shoulder 120 of leg 118 and is elongate permitting holder 32 to move relative to the structure 34 to which holder 32 is mounted in a direction toward or away from structure 36 (FIG. 1). In the embodiment shown in FIGS. 15-17, biasing element 52 is a spring 148 having a pair of oppositely extending biasing arms 151 that also extend generally downwardly in contact with holder shoulder 120. Each spring arm 151 can have an upturned or radiused foot 152 at or adjacent the spring arm end 153 to help better maintain sliding contact with holder shoulder 120 during biasing arrangement operation. Spring 148 can be a torsion spring that includes a torsion spring coil 150 carried by stem 142 that can be formed with a plurality of wire coils depending on the biasing force needed or desired.

In operation, spring arms 151 bear against shoulder 120 of holder 30 with the torsion spring coil 150 causing a downward force to be applied against shoulder 120. As a result of stem 142 being able to ride in slot 144 in holder 32, the biasing force applied by spring arms 151 against the shoulder 120 urges the holder 32 downwardly until bristles 46 of brush seal 30 contact structure 36 against which brush seal 30 seals. As bristle wear occurs, this biasing force further displaces the holder 32 and hence the brush seal 30 further toward structure 36. This helps maintain the seal provided by brush seal 30 while accommodating wear. Should debris or a discontinuity be encountered, biasing arrangement 50 allows the brush seal 30 to "float" over the debris or discontinuity. This can help prevent brush seal damage. This can also better maintain seal integrity while the brush seal 30 floats over the debris or discontinuity.

Figure 19:
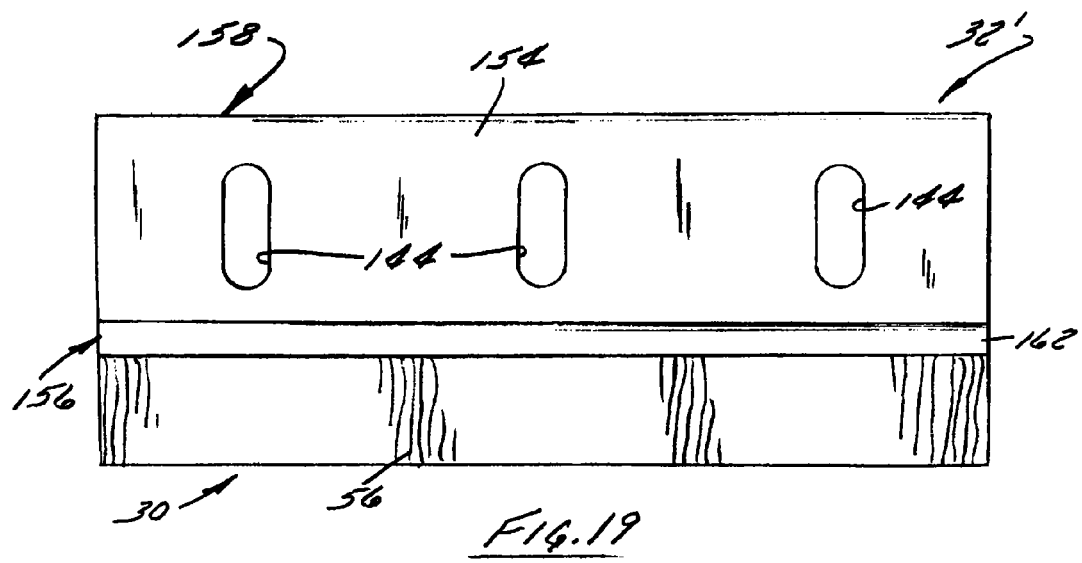
FIG. 19 is a front elevation view of the holder of FIG. 18.
Figure 18:
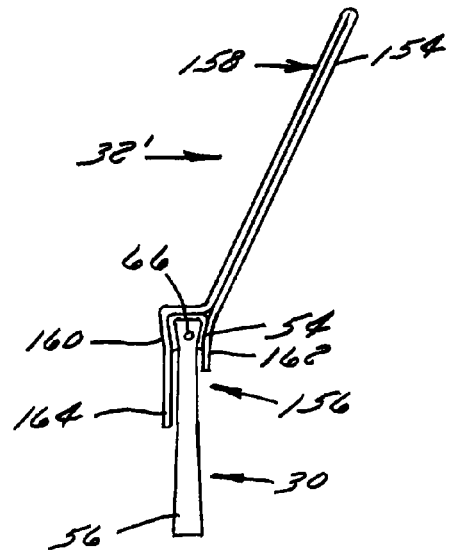
FIG. 18 is a side elevation view of another embodiment of a brush seal holder configured to orient a brush seal in the holder at an angle.

FIGS. 18 and 19 illustrate another preferred embodiment of a holder 32' that is angled in a manner that orients brush seal 30 at an angle relative to the surface against which its bristles 46 contact during seal operation. As is shown in FIG. 19, holder 32' is configured with a plurality of spaced apart slots 144 that are each capable of receiving a stem of a fastener, such as stem 142 of fastener 140 in FIG. 15, used to mount holder 32' to a structure of the apparatus in which the brush seal 30 is being used. These slots 144 also enable the holder 32' to be used with a biasing arrangement, such as biasing arrangement 50, in a manner that urges brush seal 30 continuously against a surface of a structure against which brush seal 30 is sealing.

With reference to FIG. 18, holder 32' can be made of a single sheet 154 of material, such as a metal like stainless steel, formed in a manner that provides a channel 156 in which spine 54 of brush seal 30 can be removably retained. Holder 32' has a mount 158 in which slots 144 can be disposed enabling the holder 32' to be mounted in a manner where it can be biased toward the structure against which brush seal 30 seals. Mount 158 is attached to brush seal holding channel 156 at an angle thereby orienting brush seal 30 at an angle relative to the surface against which bristles 46 of the brush seal 30 seal against during operation. As previously discussed, such an angle can orient brush seal 30 so it is acutely angled relative to the surface of the structure against which brush seal 30 seals.

Brush seal retainer channel 156 is defined by a pair of channel lips 160, 162 with one of the lips 160 having a downwardly extending skirt 164 that extends outwardly beyond brush seal spine 54 further than lip 162 in a manner that can help protect and support bristles 46. Skirt 164 can extend even further beyond spine 54, such as where additional bristle support or protection is desired or needed. For example, if desired, skirt 164 can extend over halfway the length of the bristles 46 where additional protection and support is needed. If desired, the other channel lip 162 can be configured with such a bristle support skirt.

Figure 20:
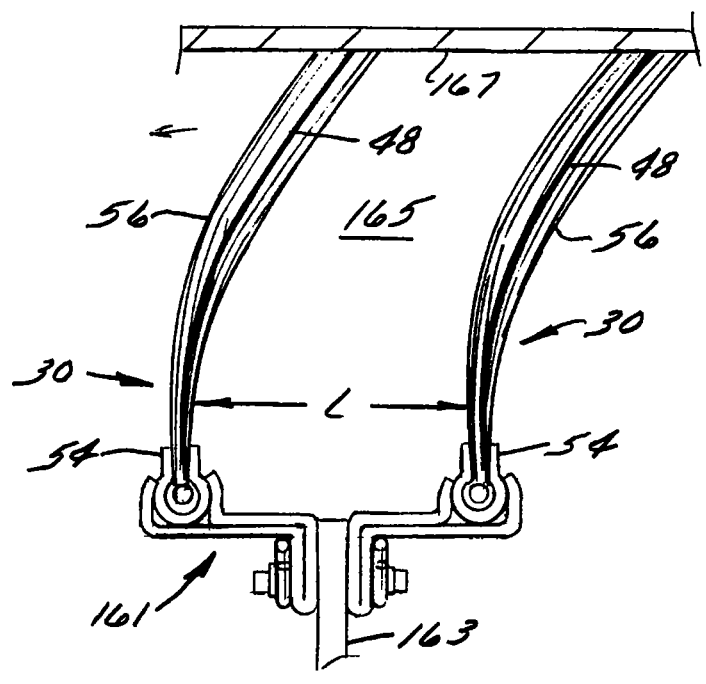
FIG. 20 is a fragmentary sectional view illustrating a dual brush seal holder arrangement.

FIG. 20 illustrates a modified holder arrangement 161 attached to structure 163, such as a regenerative air preheater divider wall, which is configured to hold a pair of brush seals 30 that each brush against surface 167, such as a surface of a sector plate, defining a dead space 165 in between the two brush seals 30 having a length, L, and providing a redundant or double seal arrangement. Holder arrangement 161 can be configured using a pair of holders like that shown in FIGS. 15-17, like that shown in FIGS. 18-19 or using another holder configuration.

Holder arrangement 161 is shown in FIG. 20 with the brush seals 30 disposed in parallel with each other but can be configured to dispose one brush seal 30 at an angle relative to the other brush seal 30. If desired, holder arrangement 161 can also be configured to orient one or both brush seals 30 so the brush seal forms an acute included angle with the surface 164 against which bristles 46 come into contact during operation. Where used with a regenerative air preheater, the length, L, of the dead space 165 between the two brush seals 30 should be less than the minimum dimension of any surface the brush seals 30 traverse, such as a minimum width of a preheater sector plate traversed by the brush seals 30.

Figure 21:
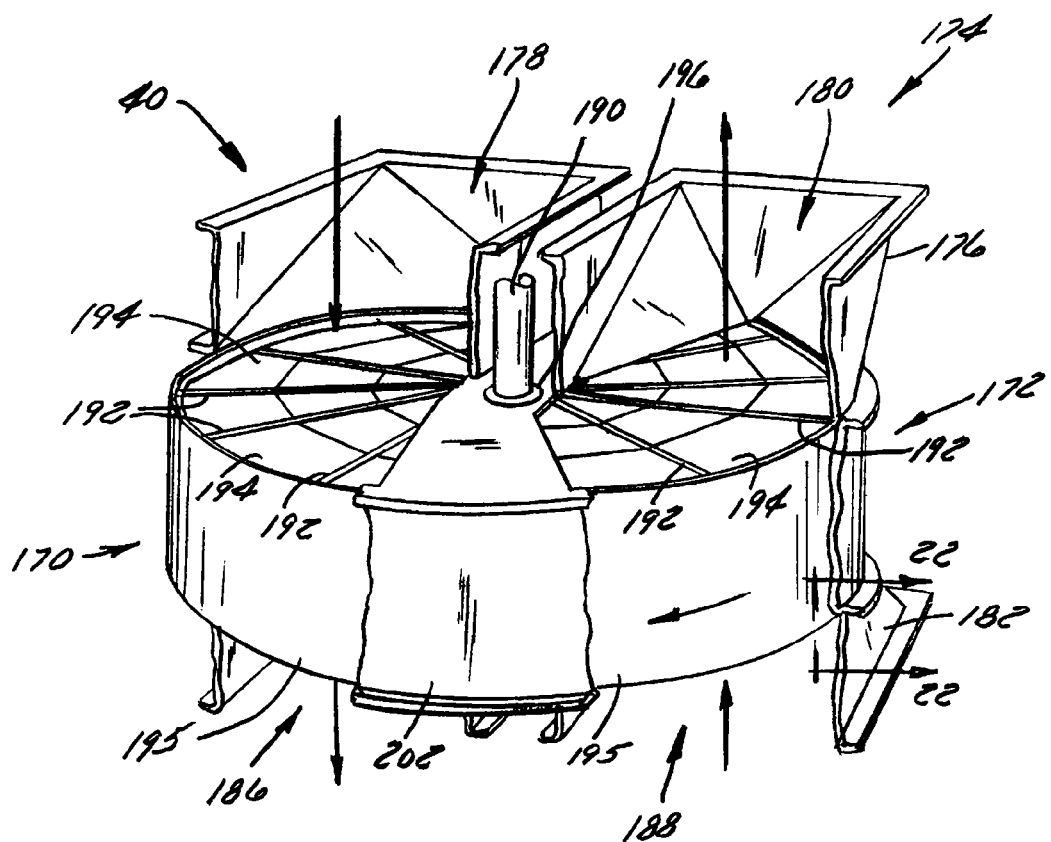
FIG. 21 is a perspective view of a regenerative air heater with portions of its outer housing removed to show details of an inner rotor.
Figure 22:
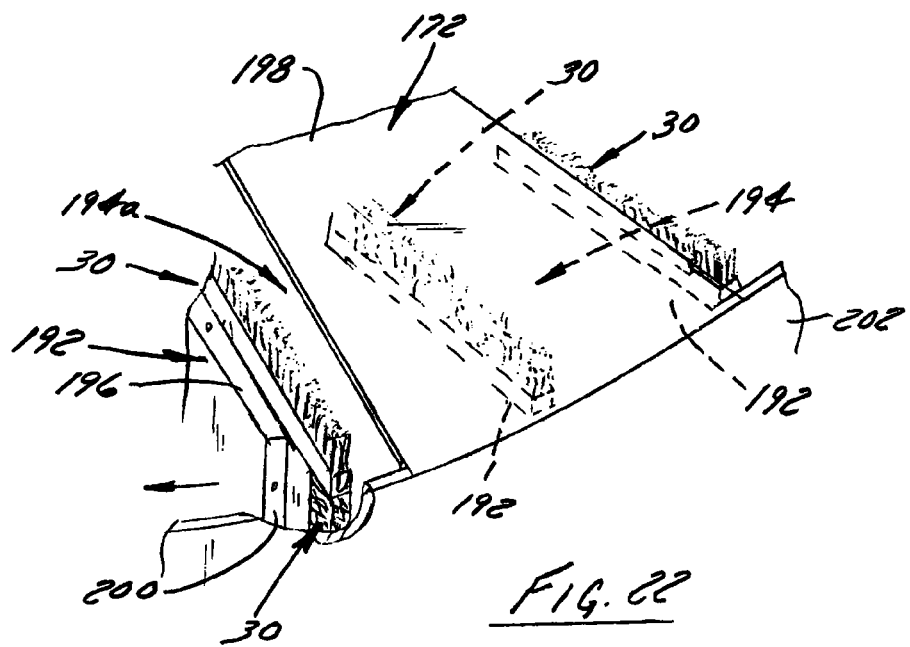
FIG. 22 is a partial fragmentary view of part of the preheater of FIG. 21 illustrating brush seal use.

FIGS. 21 and 22 illustrate in more detail an exemplary regenerative air heater 40 fitted with brush seals 30 constructed in accordance with the present invention that are equipped with a stress and deflection accommodating membrane 48, such as in the form of membrane 48a or 48b. Preheater 40 can be of rotating plate construction, e.g., RAPH, having a central rotor 170 disposed in a generally cylindrical stationary casing or housing 172. The top end 174 of outer housing 172 includes a top sector plate 176 that generally bisects the upper opening of the housing 172 to define a cool air inlet 178 and a gas outlet 180, respectively. A bottom sector plate 182 is located on the bottom end 184 of the housing 172 in parallel to the top sector plate 176. Bottom sector plate 182 bisects the lower opening in the housing 172 to define a preheated air outlet 186 and a hot exhaust gas inlet 188, respectively.

Those skilled in the art will appreciate that the location of the inlets and outlets of heat exchanging apparatus 40 may be reversed or otherwise changed without departing from the scope of the present invention. Furthermore, the axis of the preheater 40 is not limited to a vertical orientation as shown in FIG. 21, but could also be oriented horizontally or at any of a wide variety of orientations.

Rotor 170 includes a rotatable center shaft 190 that is aligned with the axial centerline of the outer housing 172. A number of radial divider walls 192 extend radially outwardly from the center shaft 190 toward the housing 172. Radial walls 192 define a plurality of pie-shaped or arcuate sectors 194 within heat exchanging rotor 170. Each sector 194 extends from the top end 174 to the bottom end 184 of the heat exchanger 40 to define an air or gas conduit when the sector 194 opens into either the air inlet 148 and outlet 186 or the gas inlet 188 and outlet 180.

With reference to FIG. 22, sectors 194a and 194b have heat exchange core sectors located between divider walls 192 and supported on cages (not shown) that span the walls 192 of each sector 194a and 194b defining a heat exchange basket. Each heat exchange basket contains a mass of heat absorbent material commonly comprised of stacked plate-like elements. Although only a pair of heat exchange core sectors is depicted in FIG. 22, it should be understood that such a heat exchange core sector is located in each one of the sectors 194 of the preheater 40.

During operation of preheater 40, air is fed through the air inlet 178, heated by heat exchange in the rotating rotor 170 from exhaust gases entering exhaust gas inlet 188, directed out of the air outlet 186, and conveyed to an air intake (not shown) of a power plant. In turn, hot exhaust gases from the power plant are fed into the exhaust gas inlet 188, flow through the rotor 170 to exhaust gas outlet 180, and thence are directed to post-treatment equipment such as scrubbers.

In one exemplary preheater, such exhaust gases are typically flue gases entering the exhaust gas inlet at a relatively high temperature of about 700° Fahrenheit and air entering the air inlet can range from ambient to about 100° Fahrenheit. The preheated air exits the air outlet at a temperature range of about 450°-620° Fahrenheit where it forms the combustion air entering at least one boiler of a power plant. Flue gas exits the exhaust outlet at a temperature of about 270°-300° Fahrenheit where they can be discharged out the stack or further treated before being discharged out the stack. Thus, in at least one preferred embodiment, the materials of the brush seal 30, including the spine 54, bristles 46 and membrane 48a or 48b is made of materials capable of withstanding temperatures of at least 700° Fahrenheit. In another preferred embodiment, the brush seal components are made of materials capable of operating at a temperature of at least 800° Fahrenheit.

As hot exhaust gases enter the exhaust gas inlet 188, they pass through heat absorbent material of a heat exchange basket in one or more of the sectors 194 thereby heating the heat absorbent material to a higher temperature. As the rotor 170 rotates, the heated heat absorbent material of the heat exchange baskets of these sectors 194 rotates in front of the air inlet 178 causing the air to pass through the heat absorbent material thereby heating it to a higher temperature before the air exits out the air outlet 186. The preheated air discharged out the air outlet 186 enters the power plant at a higher temperature than it would have without preheating, increasing power plant efficiency.

As is best shown in FIG. 21, radially extending brush seals 30 are mounted along the top edges 186 of each radially extending divider wall 182 with each brush seal 30 contacting an inner surface of a top wall 198 of the housing 172 providing a seal therebetween. If desired, a generally vertically extending brush seal 30 can be mounted along each outer radial edge 200 of each divider wall 192 contacting an inner surface of an outer sidewall 202 of the housing 172 providing a seal therebetween. Seals provided by the brush seals 30 prevent air or gasses in sectors or conduits 194a and 194b from flowing around the outer edges 196 and 200 of divider walls 192 into an adjacent sector or conduit thereby maximizing heat transfer efficiency as well as minimizing power plant emissions.

Such a brush seal 30 constructed in accordance with the present invention can be used in providing a circumferential seal within preheater 40, such as by providing a circumferential seal between outer wall of rotor 170 and inner surface of housing sidewall 172. Such a brush seal 30 can be formed to have a radius of curvature and/or constructed of curved brush seal segments to form such a circumferential seal that can be continuously extending. In a similar manner, a brush seal 30 or segments of a brush seal 30 can be formed to provide an annular seal.

Brush seal 30 can be welded in place in a desired orientation relative to the surface against which its bristles 46 will contact during sealing. Brush seal 30 can also be disposed in a holder, such as holder 32 or 32' that can also be configured to orient the brush seal 30 at a desired angle that can range between 15° and 90°. Such a holder can be configured to hold a pair of brush seals 30 side-by-side and can be spaced apart to define a dead space therebetween that can improve sealing.

Such a brush seal 30 constructed in accordance with the invention can be used with other types of preheaters and heat exchangers. For example, brush seal 30 can be used in tri-sector or quad-sector heat exchangers. It should also be apparent that brush seal 30 is not limited to use in rotating plate heat exchangers. For example, brush seal 30 can also be used in stationary plate regenerative air preheaters.

In operation of brush seal 30, bristles 46 of the seal 30 brush against a surface of a structure against which the brush 30 is intended to seal. As this occurs, bristles 46 deflect, typically by being at least slightly bent at their ends. The tightly packed bristles 46 oppose gas movement through them thereby providing a seal that minimizes heat transfer with bristle deflection helping ensure more effective sealing.

Embedded sealing membrane 48 improves sealing by providing a barrier that can be imperforate that obstructs gas flow across it. Both stress and deflection accommodating membrane embodiments 48a and 48b improve seal operation by accommodating such bristle deflection without tearing or pulling apart. As a result, seal performance is increased along with brush seal life.

Where a pair of such brush seals 30 are used, such as in a tandem or side-by-side configuration, the resultant redundancy provided can further improve sealing performance and seal life.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A brush seal comprising:
   an elongate spine;
   a plurality of pairs of bristles extending outwardly from the spine; and
   an elongate longitudinally extending flexible sealing membrane disposed in contact with a plurality of the bristles on opposite sides thereof, the flexible sealing membrane comprised of a plurality of flexible sealing membrane layers extending outwardly from the spine that overlap one another with each flexible sealing membrane layer having a plurality of spaced apart deformation regions formed therein that are deformable in response to one of stress and deflection allowing extensibility thereof along a lengthwise extent in accommodating the one of stress and deflection; and
   an elongate core wire from which the bristles and flexible sealing membrane layers outwardly extend, the core wire received in the spine with the spine retaining the bristles and flexible sealing membrane layers there between.

2. The brush seal of claim 1 wherein the plurality of bristles disposed on opposite sides of the sealing membrane are formed by a plurality of pairs of elongate filaments wrapped around the core wire.

3. The brush seal of claim 1 wherein the flexible sealing membrane layers slidably overlap one another enabling relative sliding movement of one flexible sealing membrane layer relative to another flexible sealing membrane layer in response to one of stress and deflection in accommodating the one of stress and deflection.

4. The brush seal of claim 3 wherein there are a plurality of layers of bristles on opposite sides of the overlapping flexible sealing membranes extending substantially along the length of the brush seal and wherein the flexible sealing membrane and the bristles are comprised of a high temperature resistant material resistant to temperatures of at least 700° Fahrenheit.

5. The brush seal of claim 4 wherein the flexible sealing membrane is made of an imperforate material having a thickness no greater than a width or diameter of one of the plurality of pairs of brush bristles.

6. The brush seal of claim 1 wherein the flexible sealing membrane is made of a material having a thickness no greater than a width or diameter of one of the plurality of pairs of brush bristles making the flexible sealing membrane deformable around a portion of the one of the plurality of brush bristles.

7. The brush seal of claim 1 wherein the bristles and the flexible sealing membrane are made of a high temperature resistant material capable of withstanding a temperature of at least 700° Fahrenheit.

8. The brush seal of claim 1 wherein the plurality of spaced apart deformation regions produce a flexible sealing membrane that is three-dimensionally contoured along the lengthwise direction of the flexible sealing membrane layers providing extensibility of each flexible sealing membrane layer along a lengthwise direction enabling accommodation of at least one of stress and deflection through flexible sealing member layer length change.

9. The brush seal of claim 1 wherein the flexible sealing membrane is made of a single continuous sheet comprised of a plurality of spaced apart deformation regions that reduce the length of the sheet while permitting extensibility of the flexible sealing membrane in response to one of stress and deflection.

10. The brush seal of claim 1 wherein each deformation region deforms a portion of the corresponding flexible sealing membrane layer outwardly transversely relative to a longitudinal extent of the sealing membrane.

11. The brush seal of claim 10 wherein each flexible sealing membrane layer has a plurality of pairs of transversely outwardly and alternately extending deformation regions.

12. The brush seal of claim 11 wherein each deformation region of each flexible sealing membrane layer comprises an integrally formed flute.

13. The brush seal of claim 11 wherein the flexible sealing membrane is made of a metallic foil having a thickness no greater than a width or diameter of one of the plurality of pairs of brush bristles.

14. The brush seal of claim 13 wherein the metallic foil is deformable around a portion of one of the plurality of brush bristles.

15. The brush seal of claim 14 wherein the bristles and the flexible sealing membrane are comprised of a material capable of withstanding a temperature of at least 700° Fahrenheit.

16. The brush seal of claim 11 wherein the overlapped sealing membrane layers define one of a zig zag and wavy three dimensional contour extending in a lengthwise direction of the brush seal.

17. The brush seal of claim 11 wherein the flexible sealing membrane layers extend outwardly from the spine a distance at least two thirds the length of the plurality of pairs of bristles.

18. The brush seal of claim 17 wherein the flexible sealing membrane layers extend outwardly from the spine a distance substantially the same as the length of the plurality of pairs of bristles.

19. The brush seal of claim 1 wherein the flexible sealing membrane layers are imperforate.

20. The brush seal of claim 1 wherein the plurality of bristles in contact with opposite side of the plurality of overlapped flexible sealing membrane layers provide support to the plurality of overlapped flexible sealing membrane layers.

21. The brush seal of claim 20 wherein the sealing membrane is generally rectangular and folded about a longitudinal axis extending along the spine forming the plurality of flexible sealing membrane layers extending outwardly from the spine that overlap one another in a manner permitting slidable relative movement therebetween.

22. A brush seal comprising:
an elongate generally rectangular flexible sealing membrane comprised of at least one pair of longitudinally slidably overlapping flexible sealing membrane sheets having a portion of one of the flexible sealing membrane sheets longitudinally slidably overlapping a portion of an adjacent one of the flexible membrane sheets forming a longitudinally slidably overlapping region, the generally rectangular flexible sealing membrane folded about a longitudinal axis forming a plurality of transversely slidably overlapping flexible sealing membrane layers capable of generally transverse slidable relative movement there between with each pair of longitudinally slidably overlapping flexible sealing membrane sheets capable of generally longitudinal slidable relative movement there between;
a plurality of pairs of elongate bristle filaments folded about the flexible sealing membrane layers forming a plurality of sets of bristles in which the overlapping flexible sealing membrane layers are embedded;
an elongate core wire defining the longitudinal fold axis about which the flexible sealing membrane sheets and bristle filaments are folded; and
an elongate spine formed around the portion of the flexible sealing membrane sheets and bristle filaments that are folded about the core wire fixing the flexible sealing membrane sheets and the elongate bristle filaments substantially in place.

23. The brush seal of claim 22 wherein the sealing membrane sheets are each comprised of an imperforate metallic foil having a thickness less than a width or diameter of one of the bristles that is capable of withstanding a temperature of at least 700° Fahrenheit.

24. The brush seal of claim 22 wherein each one of the flexible sealing membrane sheets is imperforate.

25. The brush seal of claim 22 wherein each one of the flexible sealing membrane sheets are deformable about a portion of one of the plurality of bristles.

26. A brush seal comprising:
an elongate core wire extending longitudinally substantially the length of the brush seal;
an elongate sealing membrane folded around the core wire, the flexible sealing membrane comprised of a plurality of overlapping flexible sealing membrane layers capable of slidable relative movement there between, with each flexible sealing membrane layer comprised of a plurality of spaced apart deformation regions;
a plurality of pairs of elongate filaments folded around the core wire over the sealing membrane, the plurality of pairs of elongate filaments defining a plurality of pairs of elongate bristles when folded around the core wire that are disposed on opposite sides of the overlapped flexible sealing membrane layers embedding the overlapped flexible sealing membrane layers within the bristles with the bristles supporting the flexible sealing membrane layers there between; and
an elongate outer spine extending longitudinally substantially the length of the brush seal, the outer spine overlying the core wire clamping the plurality of pairs of filaments and the sealing membrane there between; and
wherein each flexible sealing membrane layer has a thickness less than a width or diameter of the brush bristles; and
wherein the sealing membrane layers and bristles are comprised of a material capable of withstanding a temperature of at least 700° Fahrenheit.

27. The brush seal of claim 26 wherein the sealing membrane is generally rectangular and folded around the core wire with the core wire defining a longitudinal axis about which the generally rectangular flexible sealing membrane is folded forming a plurality of elongate generally rectangular slidably overlapped flexible sealing membrane layers.

28. The brush seal of claim 26 wherein each flexible sealing membrane layer is comprised of a plurality spaced apart flutes integrally formed therein that each define a corresponding one of the deformation regions and wherein the plurality of spaced apart flutes impart lengthwise extensibility to the flexible sealing membrane layers.

* * * * *